(12) United States Patent
Shi

(10) Patent No.: US 11,949,771 B2
(45) Date of Patent: *Apr. 2, 2024

(54) SECURE BLOCKCHAIN INTEGRATED CIRCUIT

(71) Applicant: Alexander Yuan Shi, San Diego, CA (US)

(72) Inventor: Alexander Yuan Shi, San Diego, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/307,933

(22) Filed: May 4, 2021

(65) Prior Publication Data
US 2022/0045842 A1    Feb. 10, 2022

Related U.S. Application Data

(63) Continuation of application No. 16/322,099, filed as application No. PCT/US2019/015735 on Jan. 29, 2019, now Pat. No. 10,999,059.

(Continued)

(51) Int. Cl.
*H04L 9/06*   (2006.01)
*G06Q 20/36*  (2012.01)
(Continued)

(52) U.S. Cl.
CPC ........... *H04L 9/06* (2013.01); *G06Q 20/3674* (2013.01); *G06Q 20/389* (2013.01);
(Continued)

(58) Field of Classification Search
CPC ....... H04L 9/06; H04L 9/0819; H04L 9/3213; G06Q 20/3674; G06Q 20/389; G06Q 20/401

See application file for complete search history.

(56) References Cited

U.S. PATENT DOCUMENTS 6,704,871 B1 * 3/2004 Kaplan ................... G06F 21/74
713/192
8,433,658 B2   4/2013 Bishop et al.
(Continued)

OTHER PUBLICATIONS

Shan Tang (A List of Chip/IP for Deep Learning, medium.com, Aug. 11, 2017, 17 pages) (Year: 2017).*

(Continued)

*Primary Examiner* — Oleg Korsak
(74) *Attorney, Agent, or Firm* — MORRISON & FOERSTER LLP

(57) ABSTRACT

An integrated circuit comprising a CPU coupled to a system bus, a network interface configured to interface with an external device, and a crypto neuromorphic core coupled to the system bus. The cryptographic core comprising a processor or core, an internal bus, and a non-transitory computer-readable memory, wherein the crypto neuromorphic core is isolated from the CPU and the network interface via the system bus and the crypto neuromorphic core runs its own operating system. The crypto neuromorphic core is configured to: contain a secure core comprising a secure processor and dedicated/protected memory; store a private key in the dedicated/protected memory accessible to the secure core but not accessible to other components of the crypto neuromorphic core, the central processing unit, and the network interface; add data to a blockchain using the private key via the network interface; and read data from the blockchain via the network interface.

23 Claims, 9 Drawing Sheets

Related U.S. Application Data

(60) Provisional application No. 62/675,049, filed on May 22, 2018, provisional application No. 62/634,744, filed on Feb. 23, 2018, provisional application No. 62/623,422, filed on Jan. 29, 2018.

(51) Int. Cl.
| | | |
|---|---|---|
| *G06Q 20/38* | (2012.01) | |
| *G06Q 20/40* | (2012.01) | |
| *H04L 9/08* | (2006.01) | |
| *H04L 9/32* | (2006.01) | |
| *G06N 20/00* | (2019.01) | |
| *H04L 9/00* | (2022.01) | |

(52) U.S. Cl.
CPC ......... *G06Q 20/401* (2013.01); *H04L 9/0819* (2013.01); *H04L 9/3213* (2013.01); *G06N 20/00* (2019.01); *H04L 9/50* (2022.05); *H04L 2209/56* (2013.01)

(56) References Cited

U.S. PATENT DOCUMENTS

| | | | | |
|---|---|---|---|---|
| 2008/0109903 A1* | 5/2008 | Werner | ............... | G06F 12/1458 711/E12.1 |
| 2010/0332843 A1* | 12/2010 | Boivie | ................... | G06F 21/72 713/189 |
| 2015/0170112 A1 | 6/2015 | Decastro et al. | | |
| 2015/0365283 A1* | 12/2015 | Ronca | .................. | G06Q 20/065 705/71 |
| 2016/0162897 A1 | 6/2016 | Feeney et al. | | |
| 2016/0261411 A1* | 9/2016 | Yau | .................. | G06Q 20/38215 |
| 2019/0026146 A1* | 1/2019 | Peffers | .................. | G06F 9/5044 |

OTHER PUBLICATIONS

IDRBT Journal of Banking Technology, vol. 1, No. 1, 2017, 100 pages (Year: 2017).*

Nica et al. "Cryptocurrencies: Concept and Current Market Structure", University of Manchester, FinTech working paper No. 1, Oct. 25, 2017, 65 pages (Year: 2017).*

Nica et al. "Cryptocurrencies: Concept and Current Market Structure," University of Manchester, FinTech working paper No. 1, Oct. 25, 2017, [retrieved on Mar. 25, 2019]. Retrieved from the internet: <URL:https://papers,ssrn.com/sol3/papers.cfm?abstract_id=3059599> pp. 1-65.

Ramasastri et al. IDRBT Journal of Banking Technology,, vol. 1 No. 1, Jul.-Dec. 2017. Retrieved on 2019-03-251. Retrieved from the Internet: <URL:http://www.idrbt.ac.in/IssueNo.I_Sep2017 .pdf> pp. 1-100.

* cited by examiner

SECURE BLOCKCHAIN INTEGRATED CIRCUIT

CROSS-REFERENCE TO RELATED APPLICATIONS

This application is a continuation of U.S. application Ser. No. 16/322,099, filed on Jan. 30, 2019, which is a U.S. 371 National Phase of PCT/US19/15735, filed on Jan. 29, 2019, and claims the benefit of U.S. Provisional Patent Application No. 62/623,422, filed Jan. 29, 2018; U.S. Provisional Patent Application No. 62/634,744, filed Feb. 23, 2018; and U.S. Provisional Patent Application No. 62/675,049, filed May 22, 2018, the contents of which are incorporated herein by reference in their entireties for all purposes.

FIELD OF THE DISCLOSURE

This relates generally to secure integrated circuit for supporting distributed ledger technology operations.

BACKGROUND OF THE DISCLOSURE

Distributed ledger technology (DLT) (e.g., blockchains, directed acyclic graphs (DAGs)) use asymmetric cryptography to identify account holders and sign transactions that are added to a distributed ledger (e.g., a linked list of data blocks). For example, a transaction moving tokens out of a blockchain wallet can be signed with the private key associated with that wallet. Others can verify that transaction using the corresponding public key associated with the wallet. Currently, private keys can be stored in software wallets (e.g., online on a cloud or on local memory of a device) which may not be secure because they are susceptible to hacking over the Internet. Private keys can also be stored in hardware wallets (e.g., on a USB device), which are more secure because the private keys are stored offline (e.g., are note accessible over the Internet). Hardware wallets are typically a cold-storage type USB where the private keys are stored in a protected area within a microcontroller. Hardware wallets are less susceptible to viruses and malware than software wallets. Many hardware wallets also require a manual user authentication (e.g., entry of a pin or passcode) or manufacturer validation (e.g., release opensource software for users to validate the device operation), but unauthorized persons can still access hardware wallets if they learn the corresponding pin or passcode. While hardware wallets are more secure than software wallets, typical hardware wallets must be plugged in via a USB port, which many Internet of Things (IoT) devices (e.g., smartphones, smart wearable devices, vehicles, home appliances, smart city equipment, or any device with embedded Internet connectivity that can communicate and/or share data over the Internet) may not support (e.g., a parking meter, a soda machine). It can also be impractical for some IoT devices such as ceiling fans or drones to have an external USB drive plugged into it during operation. Moreover, the pin to access a wallet can be intercepted when remotely interacting with an IoT device.

SUMMARY OF THE DISCLOSURE

Therefore, a secure integrated circuit for supporting distributed ledger technology operations on IoT devices can be desirable. Examples of the disclosure are directed to an integrated circuit for supporting DLT operations on IoT devices. In some examples, the integrated circuit contains embedded cores dedicated to performing blockchain operations including adding data to a blockchain, reading data from a blockchain, transferring (manually or autonomously) cryptocurrency (e.g., tokens) from one wallet to another wallet (e.g., sending, storing, and receiving cryptocurrency tokens), accessing or running decentralized applications (DApps), mining (e.g., performing proof of work and/or proof of stake operations to validate transactions), perming light node operations, storing private keys, and/or any other distributed consensus operations. In some examples, the embedded cores can have internal memory that is not accessible to other IoT device cores. In some examples, the integrated circuit can implement cold cryptocurrency wallets and secure hot cryptocurrency wallets. In some examples, the integrated circuit can include an artificial intelligence core that can control the IoT device for performing autonomous operations. These cores can help to create true autonomous machine-to-machine (M2M) operations.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples. Further, in the context of this disclosure, "core" (or the like) can refer to one or more processors optimized to perform particular processes, a cryptography processor or engine, a neural processor, a neuromorphic processor, an artificial intelligence (AI) core, an application-specific integrated circuit (ASIC), one or more processors that execute a program from memory (e.g., memory contained within the core or external to the core), or a system on a chip (SoC) (including but not limited to a processor (e.g., central processing unit (CPU), graphical processing unit (GPU), and memory (e.g., random-access memory (RAM), read-only memory (ROM)). Moreover, in the context of this disclosure, "internal bus" (or the like) can include a system bus, network interface, or similar.

Examples of the disclosure are directed to an integrated circuit for supporting DLT operations on IoT devices. In some examples, the integrated circuit contains embedded cores dedicated to performing blockchain operations including adding data to a blockchain, reading data from a blockchain, transferring (manually or autonomously) cryptocurrency (e.g., tokens) from one wallet to another wallet (e.g., sending, storing, and receiving cryptocurrency tokens), accessing or running DApps, mining (e.g., performing proof of work and/or proof of stake operations to validate transactions), permitting light node operations, storing private keys, and/or any other distributed consensus operations. In some examples, the embedded cores can have internal memory that is not accessible to other IoT device cores. In some examples, the integrated circuit can implement cold cryptocurrency wallets and secure hot cryptocurrency wallets. In some examples, the integrated circuit can include an artificial intelligence core that can control the IoT device for performing autonomous operations. These cores can help to create true autonomous M2M operations.

Figure 1:
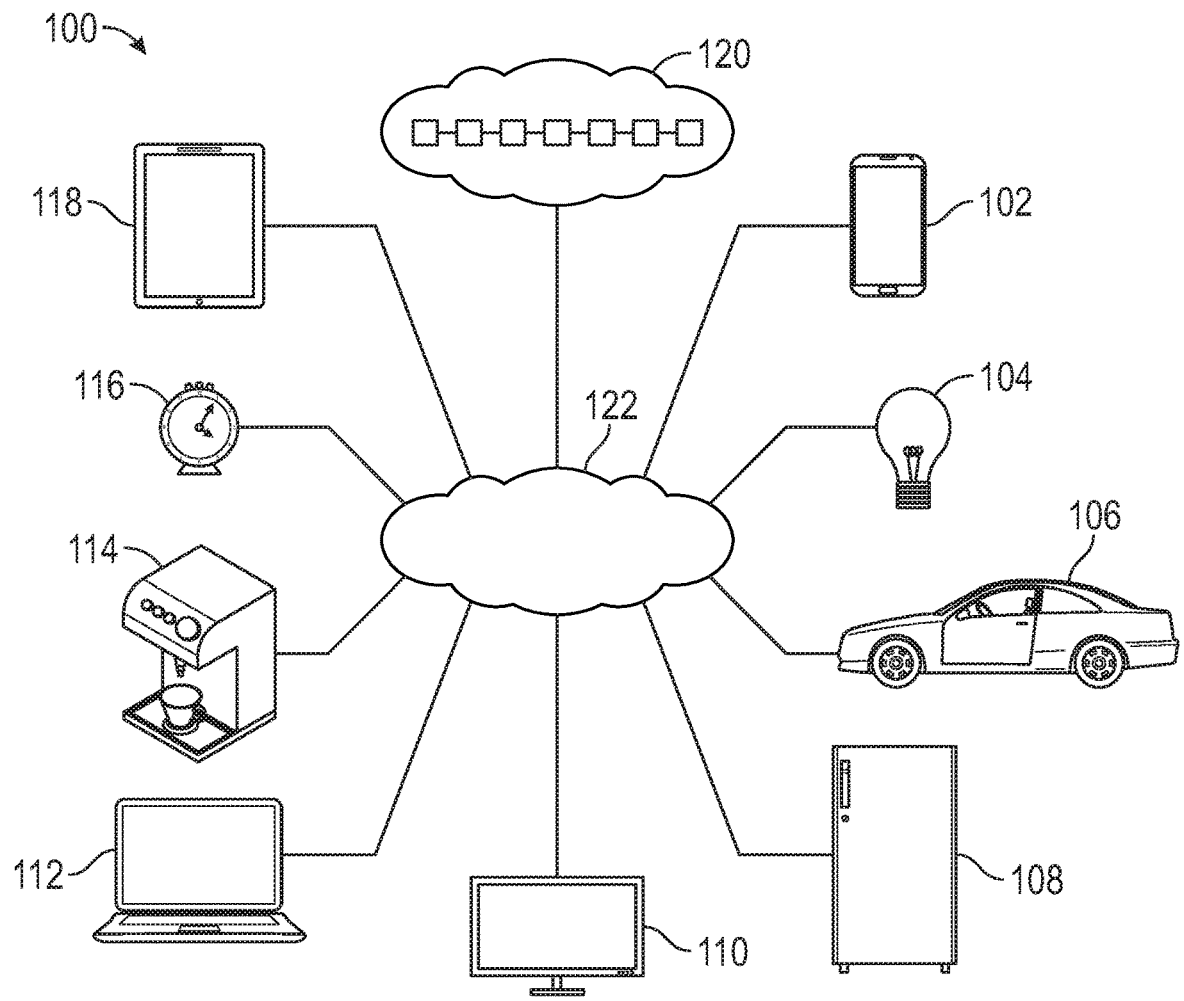
FIG. 1 illustrates a network including various devices according to examples of the disclosure.

FIG. 1 illustrates a network 100 including various devices according to examples of the disclosure. As illustrated, the devices can include IoT devices such as smartphones 102, smart lights 104, vehicles 106 (including autonomous and semi-autonomous vehicles), smart large appliances 108, smart televisions 110, computers 112 (including desktop and laptop computers), smart small appliances 114, smart clocks 116, tablets 118, or any other device with embedded communications connectivity that can communicate and/or share data with other devices. In some examples, each of IoT devices 102, 104, 106, 108, 110, 112, 114, 116, and 118 can include a central processing unit (e.g., one or more processors), memory, network interface (e.g., for Wi-Fi, cellular, Bluetooth, and/or NFC connectivity), one or more input devices (e.g., touch screen, buttons, keyboards, keypads), one or more output devices (e.g., one or more displays, one or more speakers), one or more sensors (e.g., motion sensor, radar sensors, temperature sensors, Lidar sensor, sonar sensors, accelerometers, gyroscopes, magnetometers), and/or one or more localization and navigation systems (e.g., GPS, inertial guidance systems, inertial instruments, inertial measurement units (IMU)), accelerometers, gyroscopes, and/or magnetometers). Each of IoT devices 102, 104, 106, 108, 110, 112, 114, 116, and 118 can interact (e.g., communicate) with each other via communications network 122 (e.g., the Internet). In some examples, each of IoT devices 102, 104, 106, 108, 110, 112, 114, 116, and 118 can interact (e.g., communicate) with each other directly via Bluetooth, near-field communication (NFC), a personal area network (PAN), a wireless personal area network (WPAN), or any other wireless communications protocol. For example, refrigerator 108 can detect that its door has been left open and it can generate a notification that can be sent, via communications network 122, to smartphone 102 (e.g., as a Short Message Service (SMS) text, an email, or any other type of alerts) and/or to vehicle 106 (e.g., as an SMS or Multimedia Messaging Service (MMS) message to be displayed the vehicle's infotainment center and/or read over the vehicle's speakers). In another example, alarm clock 116 can send a message or instruction to coffee machine 114 to brew coffee after the alarm goes off in the morning on a work day. In another example, a user can send an instruction to turn smart lights 104 on or off from his or her smartphone 102.

In some examples, network 100 can include one or more distributed ledgers 120 (including one or more blockchains and/or DAGs). A distributed ledger is a linked list of data blocks (e.g., storing records of transactions between a source identifier and a receiving identifier, smart contracts, DApps, or any other form of data). Each block refers back to and is linked to a prior block in the chain. Computer nodes, operating in a peer-to-peer fashion, can maintain the distributed ledger by storing a copy or a portion of the ledger and can validate new blocks that are added to the ledger (e.g., through proof of work, proof of stake, or any other distributed consensus operations). In some examples, each of IoT devices 102, 104, 106, 108, 110, 112, 114, 116, and 118 can be configured with a secure integrated circuit in accordance with this disclosure for supporting distributed ledger technology operations. These distributed ledger technology operations can include adding data to a blockchain, reading data from a blockchain, transferring (manually or autonomously) cryptocurrency (e.g., tokens) from one wallet to another wallet (e.g., sending, storing, receiving cryptocurrency tokens, or adding transactions to a blockchain), accessing or running DApps, mining (e.g., performing proof of work and/or proof of stake operations to validate transactions), perming light node operations, storing private keys, and/or any other distributed consensus operations on distributed ledger 120 through communications network 122.

Although only nine IoT devices and one distributed ledger are shown in FIG. 1, it should be understood that additional or fewer IoT devices and/or distributed ledgers can be connected to the same communications network 122. For example, distributed ledger 120 can represent one or more blockchains and/or DAGs. Other IoT devices that can be configured with a secure integrated chip in accordance with this disclosure can include, but are not limited to, smart bikes (including scooters), smart buttons, smart assistants (e.g., voice activated software assistants that can order items off of the Internet and pay with cryptocurrency token on a blockchain via the secure integrated chip), vacuums, thermostats, smart sprinkler controller, cameras, locks, data sensors, location devices, motion sensors, cash registers, payphones, toll booths, vending machines, smart robots and robotics, gas/oil sensors, water devices (e.g., water meters capable of controlling water usage or perform exchanges with others for households or businesses over a blockchain network via the secure integrated chip, water filtering devices, which can be capable of ordering new filters over the Internet and pay with cryptocurrency token on a blockchain via the secure integrated chip), government run devices, medical devices, toothbrushes, wearables (e.g., fitness watches, heart rate monitors), telecommunication devices, development boards (e.g., Arduino), sensor networks, educational devices, industrial devices (e.g., smart power grid meters/controllers, railroad/high speed train monitors, logistics tracking, monitoring, and management devices/systems, smart factory monitors, controllers, and management devices, etc.), smart glasses, keyboards, augmented reality devices, virtual reality devices, recording devices, earphones/headphones, drones, and any other devices connected to or not connected to the Internet.

Figure 2:
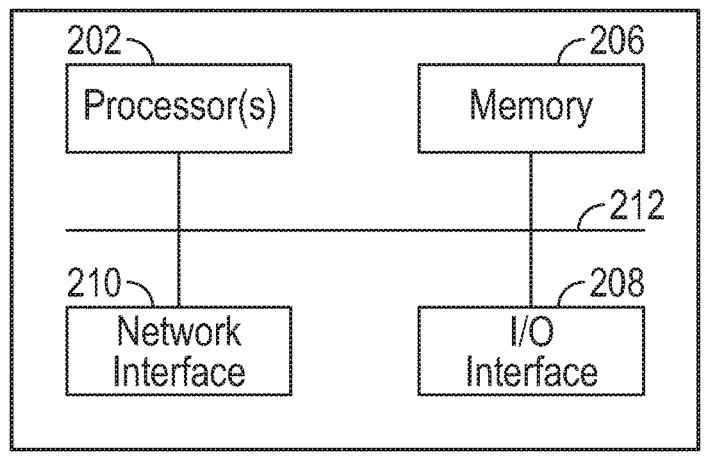
FIG. 2 illustrates a block diagram of a core according to examples of the disclosure.

FIG. 2 illustrates a block diagram of a core 200 according to examples of the disclosure. As illustrated, device 200 can include one or more processors 202 (e.g., a CPU separate from any one or more processors in a IoT device), GPU, and/or neural processing unit (NPU), network interface 210 (e.g., radio baseband interface, a transceiver), memory 206 (e.g., RAM, ROM), and input/output (I/O) interface 208 (e.g., sensor interface, camera display interface), all of which can be connected to each other via a system bus 212. One or more processors 202 can perform any of the methods described with reference to FIGS. 1 and 3-7 (including encryption and/or decryption algorithms). In some examples, processor 202 can be optimized to perform one or more methods (e.g., instructions stored in memory 206). Additionally, network interface 210 can perform any of the networking operations (e.g., transmitting and/or receiving Wi-Fi, Bluetooth, and/or ZigBee data) and/or communications (e.g., internet communications, encrypted messaging, email, text, phone calls) described with reference to FIGS. 1 and 3-7. Moreover, memory 206 can store data (including securely storing private keys) and instructions for performing any or all of the methods described with reference to FIGS. 1 and 3-7. Memory 206 can be any non-transitory computer-readable storage medium, such as a solid-state drive or a hard disk drive or a combination of both, among other examples. In some examples, memory 206 can be a protected/dedicated memory which can be used by core 200 only (e.g., it is not directly accessible to other cores or processors). In some examples, memory 206 can be a protected/dedicated memory with processing capabilities or called processor in memory (PIM) which handles both the storage and processing of the data. In some examples, I/O interface 208 can interact with any I/O components connected to core 200, including, but not limited to, one or more of a group comprising: one or more sensors, a display, keyboard, keypad, touch screen, speaker, and microphone. In some examples, core 200 can include a power management unit that is connected to processor 202 (e.g., via SPI/I2C interface) and an associated register map. In some examples, core 200 can represent a node of a distributed ledger that can store distributed ledger data, smart contracts, and/or DApps in memory 206, and/or run smart contracts and/or DApps on processor 202. In some examples, core 200 can be incorporated in any of the IoT devices shown in FIG. 1 (e.g., IoT devices 102, 104, 106, 108, 110, 112, 114, 116, and 118).

Figure 3A:
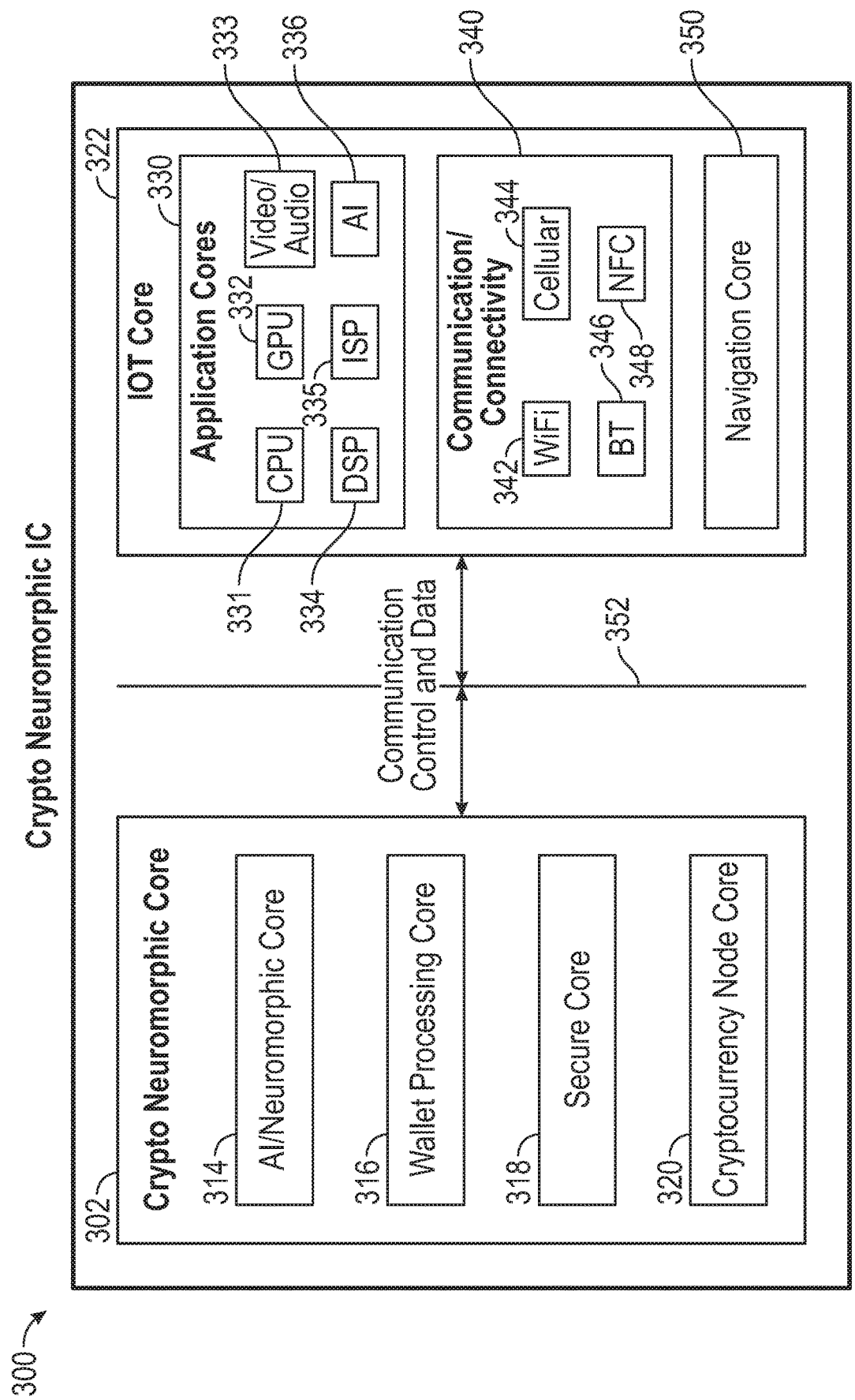
FIGS. 3A-3C illustrate integrated circuits according to examples of the disclosure.

FIG. 3A illustrates integrated circuit 300 according to examples of the disclosure. For example, integrated circuit 300 can include a crypto neuromorphic core 302 and an IoT core 322. While the crypto neuromorphic core 302 and the IoT core 322 are separate, they can communicate control signals and data through bus 352. The crypto neuromorphic core 302 is isolated by design from the IoT core 322 such that all the communications between the two cores are required to go through well designed and verified interfaces (e.g., bus 352). In some examples, the crypto neuromorphic core 302 can be its own system on chip (SoC) including a bus (e.g., an internal bus separate and distinct from bus 352) and dedicated/protected memory. In some examples, the crypto neuromorphic core 302 can have its own dedicated operating system(s) and manages its own software operations. In some examples, any communication between the IoT core 322 and the crypto neuromorphic core 302 must go through a dedicated interface (e.g., bus 352). The design and implementation may go through the highest level of standard security certification.

In some examples, the crypto neuromorphic core 302 can comprise an AI/neuromorphic core 314, a wallet processing core 316, a secure core 318, and a cryptocurrency node code 320. In some examples, the cores within the crypto neuromorphic core 302 can communicate and/or share data through an internal bus (e.g., a system bus, network interface, or similar) (not shown). In some examples, only a subset of cores can be included in the crypto neuromorphic core 302. For example, the crypto neuromorphic core 302 can include a wallet processing core 316, a secure core 318, and a cryptocurrency node code 320 without an AI/neuromorphic core 314. In some examples, each of these cores can include one or more processors and memory or share the same memory (e.g., as described above with reference to FIG. 2).

In some examples, the AI/neuromorphic core 314 can comprise a NPU to perform neural network algorithms, including deep neural networks (DNN), convolutional neural networks (CNN), and recurrent neural networks, for image classification, natural language processing, speech recognition, etc. The AI/neuromorphic core 314 can be pre-trained or constantly retrain itself such that the AI/neuromorphic core 314 can autonomously control the other cores in the crypto neuromorphic core 302 (e.g., send/receive data or cryptocurrency through a blockchain). The AI/neuromorphic core 314 can also be trained to perform user authentication through biometrics (e.g., face recognition, voice recognition, iris or retina scans, gait recognition, fingerprint matching). For example, the AI/neuromorphic core 314 can receive input, by a secured physical channel, from biometric sensors (e.g., through I/O interface 208 of FIG. 2) and can directly facilitate the hardware wallet when valid user identification detected. In some examples, the AI/neuromorphic core 314 can serve as the brain of an IoT device, allowing it to perform cognitive tasks with human-level accuracy at a practical throughput and within a practical power budget. The functionality of the AI/neuromorphic core 314 can be exposed to a processor of an IoT device via a secure API and secure communication channels. Through this interface, the processor can be able to efficiently implement custom data processing applications by loading pre-trained neural network models into the AI/neuromorphic core 314, injecting data into it and reading back partial or complete activation results. These networks can be stored in the IoT device's or the AI/neuromorphic core's ROM at time of manufacturing, or acquired, improved and updated later. In some example, the AI/neuromorphic core 314 can provide an additional layer of security by keeping track of ongoing patterns of transactions and authentications. It can train a network to detect any anomaly in these patterns, and if an anomaly is detected, the system can default to a secure state and inform the user of the anomaly, and in certain cases, the system can remove the private key(s) and disable cryptocurrency transactions or disable the crypto neuromorphic core 302 altogether. In some examples, the AI/neuromorphic core 314 can aid the development and deployment of DApps with integrated learning.

In some examples, the wallet processing core 316 is a light weight core (e.g., requires less processing power than other cores) that is dedicated to handling cryptocurrency wallet operations such as receiving and transferring cryptocurrency tokens. For example, the wallet processing core 316 can receive a request to transfer cryptocurrency tokens from a user (e.g., through I/O interface 208 of FIG. 2) or from the AI/neuromorphic core 314. This request can identify the source wallet (e.g., the public key associated with the wallet, the address of the wallet), the amount of tokens, and the destination wallet (e.g., the public key associated with the wallet, the address of the wallet). The wallet processing core 316 will generate the transaction to be posted/added to a blockchain (e.g., blockchain 120 of FIG. 1). In some examples, the wallet processing core 316 can retrieve the private key associated with the source wallet from secure core 318, sign the transaction (e.g., add a digital signature) using the private key retrieved from the secure core 318, and add the transaction to the blockchain (e.g., blockchain 120 of FIG. 1). In some examples, the wallet processing core 316 can generate the transaction, request the secure core 318 to sign the transaction, and add the signed transaction received from the secure core 318 to the blockchain (e.g., blockchain 120 of FIG. 1). In some examples, the wallet processing core 316 can generate the transaction, the secure core 318 can sign the transaction, and the cryptocurrency node core can add the signed transaction to the blockchain (e.g., blockchain 120 of FIG. 1). In some examples, the wallet processing core 316 can generate a graphical user interface for the user to enter a request to transfer cryptocurrency tokens. In some examples, this user interface can be implemented as a DApp which may run on another processor outside the crypto neuromorphic core 302. In some examples, the wallet processing core 316 can support multiple accounts or wallets.

In some examples, the secure core 318 can securely store private keys (e.g., in memory 206 of FIG. 2). For example, private keys can be stored in ROM (e.g., EEPROM) or a PIM embedded with the core (e.g., in memory 206 of FIG. 2) and which no other cores or other processors on the same chip can access. In some examples, the secure core 318 is isolated from other components outside of the crypto neuromorphic core 302 (e.g., from the IoT core 322). In some examples, any operation request or feedback would be required to go through well designed and verified interfaces within the crypto neuromorphic core 302 to prevent attacks from outside the core. In some examples, the private keys stored within the secure core 318 can be encrypted (e.g., the private keys are stored in encrypted form). In some examples, the secure core 318 can retrieve the requested private key in response to receiving a request (e.g., from a user or from the AI/neuromorphic core 314) including the public key or the address of the wallet associated with the private key. For example, the secure core 318 can perform a lookup operation based on the received public key or the address of the wallet associated with the private key. In some examples, the secure core 318 can support multiple accounts, wallets, and/or private keys. In some examples, secure core 318 can sign transaction or any other data (e.g., add a digital signature to the transaction or data) to be added to a blockchain, as described above. In some examples, secure core 318 can be powered off (e.g., operate as a cold wallet) until the user is authenticated (e.g., by entering a passcode or pin or through face recognition, voice recognition, iris or retina scan, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, or fingerprint matching) or the transaction is verified (e.g., in accordance with a determination that a service was rendered or product/good was delivered), at which point secure core 318 is powered up (e.g., by a power management unit of the integrated circuit) to operate as a hot wallet. In some examples, secure 318 can automatically power down after responding to a request (e.g., after outputting the requested private key, signing a transaction, or signing data). In some examples, secure core 318 can be in a low power mode until the user is authenticated (e.g., by entering a passcode or pin or through face recognition, voice recognition, iris or retina scan, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, or fingerprint matching) or the transaction is verified (e.g., in accordance with a determination that a service was rendered or product/good was delivered), at which point secure core 318 enters a high power mode (e.g., as invoked by a power management unit of the integrated circuit). In some examples, secure 318 can automatically enter the low power mode (e.g., as invoked by a power management unit of the integrated circuit) after responding to a request (e.g., after outputting the requested private key, signing a transaction, or signing data). In some examples, the secure core 318 is unable to access private keys or sign transactions or data when in the low power mode. Instead, the secure core 318 can only "listen" for requests while in the low power mode. By maintaining the secure core 318 in a low power mode instead of in an off state, the secure core can complete private key look ups and/or encryption operations faster because it does not have to boot up. In some examples, secure core 318 can generate private/public key pairs. In some examples, secure core 318 can support RIPEMD160, SHA224, SHA256, SHA384, SHA512, SHA3, SHA3-XOF, KECCAK and other message digests; DES (64, 128,192 bits), AES (128 bits), ECC (256 bits), RSA (1024, 2048, 3072,4096 bits) and other key generation; RSA encryption with PKCS1 v1.5, PKCS1 OEAP, and NOPAD schemes; HMAC-SHA256, HMAC-SHA512, and other HMAC signatures; RSA Signature with PKCS1 v1.5, PKCS1 PSS schemes; Elliptic Curve Diffie Hellman protocol including ECDSA/EC-Schnorr (SECP256K1, SECP256R1, Brainpool256R1, Brainpool256T1), and EdDSA (Ed25519); DES, Triple-DES, AES with ISO9797M1, ISO9797M2, NOPAD schemes, and other symmetric cryptography; and RND, Prime RND (hardware support TRNG), and other random number generation schemes.

In some examples, the cryptocurrency node core 320 functions as a node on a blockchain. For example, the cryptocurrency node core 320 can perform distributed consensus operations (e.g., performing proof of work and/or proof of stake operations to validate transactions for mining), run DApps, or support any other cryptographic processes (including any of the operations performed by secure core 318). In some examples, the cryptocurrency node core 320 can include an optimized CPU and/or GPU (e.g., as described above). In some examples, cryptocurrency node core 320 can implement a light blockchain node or a light client. In some examples, cryptocurrency node core 320 can implement a light client by not storing blockchain transactions locally and/or not interacting with the blockchain directly. For example, cryptocurrency node core 320 can interact with full nodes on a blockchain to obtain block headers (which contains the Merkle tree header), prove authenticity of information, synchronize with the blockchain with limited knowledge of prior states, obtain balances of wallets/accounts, and/or smart contract information. In other cases, the cryptocurrency node core 320 can implement a full node or a validator node to fully validate transactions and blockchains on a distributed ledger network. In some cases, the cryptocurrency node core 320 can work with secure core 318 to merge hardware wallets while running a full node to securely store private keys and create spending transactions while remaining connected to the network.

In some examples, the IoT core 322 can comprise one or more application cores 322, communication/connectivity core 340, and navigation core 350. In some examples, the cores within the IoT core 322 can communicate and/or share data through a bus (not shown). In some examples, the one or more application cores 322 can include a CPU 331, a GPU 332, video and/or audio units 333, a digital signal processor (DSP) 334, an image signal processor 335, and/or an AI unit (e.g., a NPU). In some examples, the communication/connectivity core 340 can include a Wi-Fi internet interface 342, a cellular internet/telecommunications interface 344, Bluetooth interface 346, and/or NFC interface. In some examples, the navigation core 350 can include localization and navigation systems, including Global Navigation Satellite Systems (GNSS) (e.g., GPS, BeiDou, Galileo, etc.), inertial navigation systems (INS) (e.g., inertial guidance systems, inertial instruments, inertial measurement units (IMU)), and/or sensors (e.g., accelerometers, gyroscopes, magnetometers) for determining the IoT device's location and/or direction. In some examples, the IoT core 322 can user the crypto neuromorphic core 302 to interact with a blockchain. For example, the one or more application cores 322 can run an application on an IoT device (e.g., a smartphone) that allows the user to pay for goods and services with cryptocurrency tokens. The user can enter payment to a merchant (including the source of the cryptocurrency tokens, the amount of cryptocurrency tokens, and the destination) through the application running on the IoT device and the IoT core 322 can send a request (via bus 352) to the crypto neuromorphic core 302 complete the payment (e.g., as described below with reference to FIG. 5). The crypto neuromorphic core 302 can then return a confirmation or an error message to be displayed to the user by the application running on the one or more application cores 322. In some examples, the navigation core 350 can provide localization and/or movement data to the crypto neuromorphic code 314.

In some examples, the crypto neuromorphic core 302 can automatically power down after responding to a request (e.g., after outputting the requested private key, signing a transaction, or signing data). In some examples, the crypto neuromorphic core 302 can be in a low power mode until an external trigger "wakes" it up (e.g., a user requests for cryptocurrency transactions via the interface (e.g., bus 352) between the IoT core 322 and the crypto neuromorphic core 302), at which point the crypto neuromorphic core 302 enters a high power mode. In some examples, the crypto neuromorphic core 302 can automatically enter the low power mode (e.g., as invoked by a power management unit of the integrated circuit) after responding to a request (e.g., after outputting the requested private key, signing a transaction, signing data, and providing the signed data to the user application). In some examples, the crypto neuromorphic core 302 is unable to access private keys or sign transactions or data when in the low power mode. Instead, the crypto neuromorphic core 302 can only "listen" for requests while in the low power mode. By maintaining the crypto neuromorphic core 302 in a low power mode instead of in an off state, the crypto neuromorphic core 302 operations can process external requests faster because it does not have to boot up.

Figure 3B:
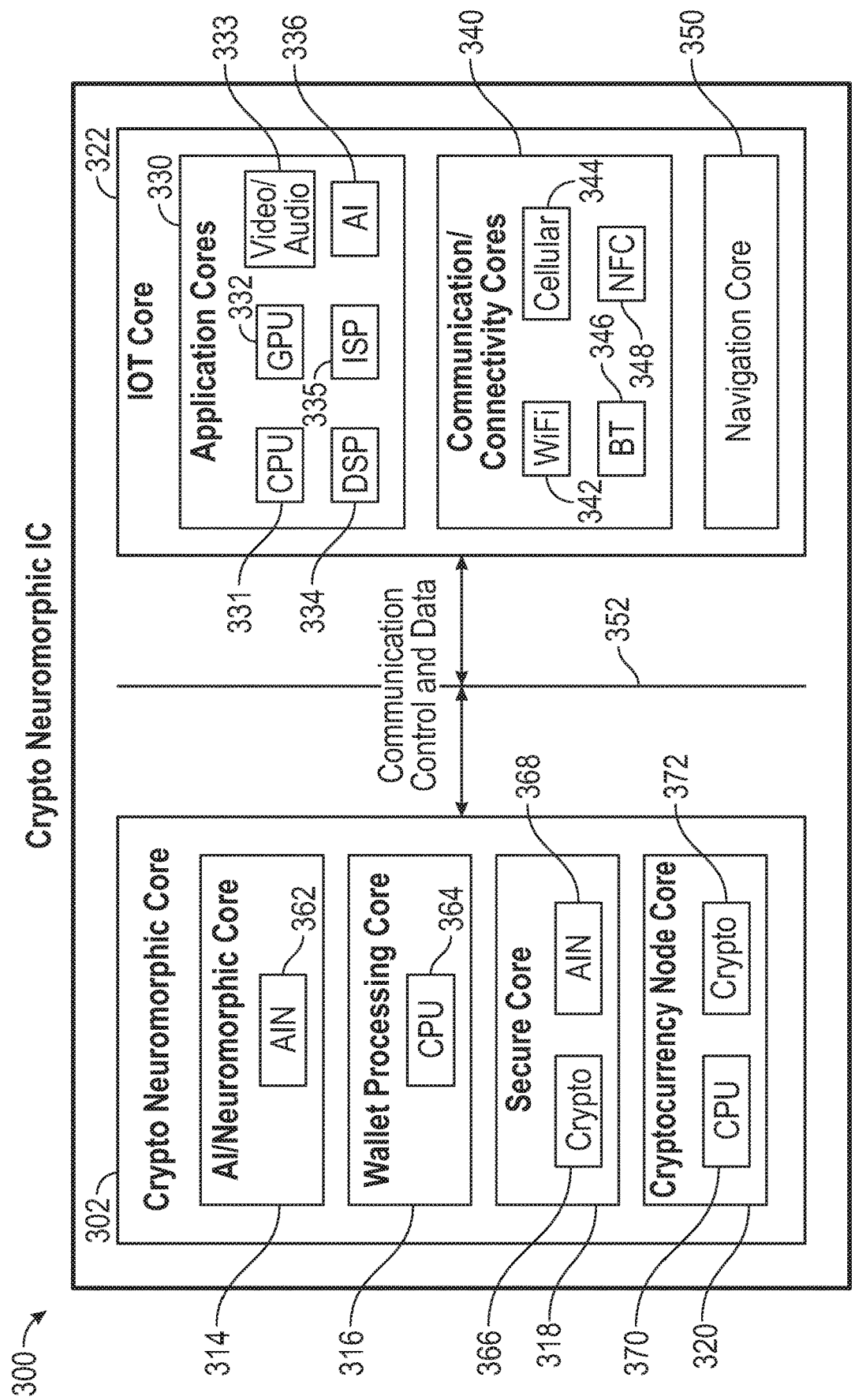

FIG. 3B illustrates an integrated circuit similar to the integrated circuit shown in FIG. 3A but with additional details according to examples of the disclosure. For example, FIG. 3B shows that the AI/neuromorphic core 314 can include an artificial intelligence neuromorphic (AIN) unit (e.g., a NPU) for performing neural network algorithms, including DNNs, CNNs, and recurrent neural networks, for image classification, natural language processing, speech recognition, etc. FIG. 3B also shows that wallet processing core 316 can include CPU 364 for executing any of methods described above with reference to wallet processing core 316 in FIG. 3A for interacting with a blockchain, including performing cryptographic and hashing operations. FIG. 3B also shows that secure core 318 can include a crypto engine 366 and AIN 368. In some examples, crypto engine 366 can perform encryption, decryption, and hashing operations. In some examples, crypto engine 366 is an optimized processor for performing these cryptographic and hashing operations. In some examples, crypto engine 366 is an ASIC hardcoded for performing these cryptographic and hashing operations.

In some examples, the AIN 368 can be an NPU as described above with reference to AI/neuromorphic core 314. FIG. 3B also shows that cryptocurrency node core 320 can include CPU 370 and crypto engine 372. In some examples, CPU 370 can be optimized for performing blockchain operations including reading data/transactions from a blockchain, adding data/transactions to a blockchain, and/or performing distributed consensus operations (e.g., performing proof of work and/or proof of stake operations to validate transactions for mining). In some examples, crypto engine 372 can be an optimized processor or an ASIC for performing encryption, decryption, and hashing operations (e.g., as described with reference to crypto engine 372. The remaining details of FIG. 3B can be the same as those of FIG. 3A.

Figure 3C:
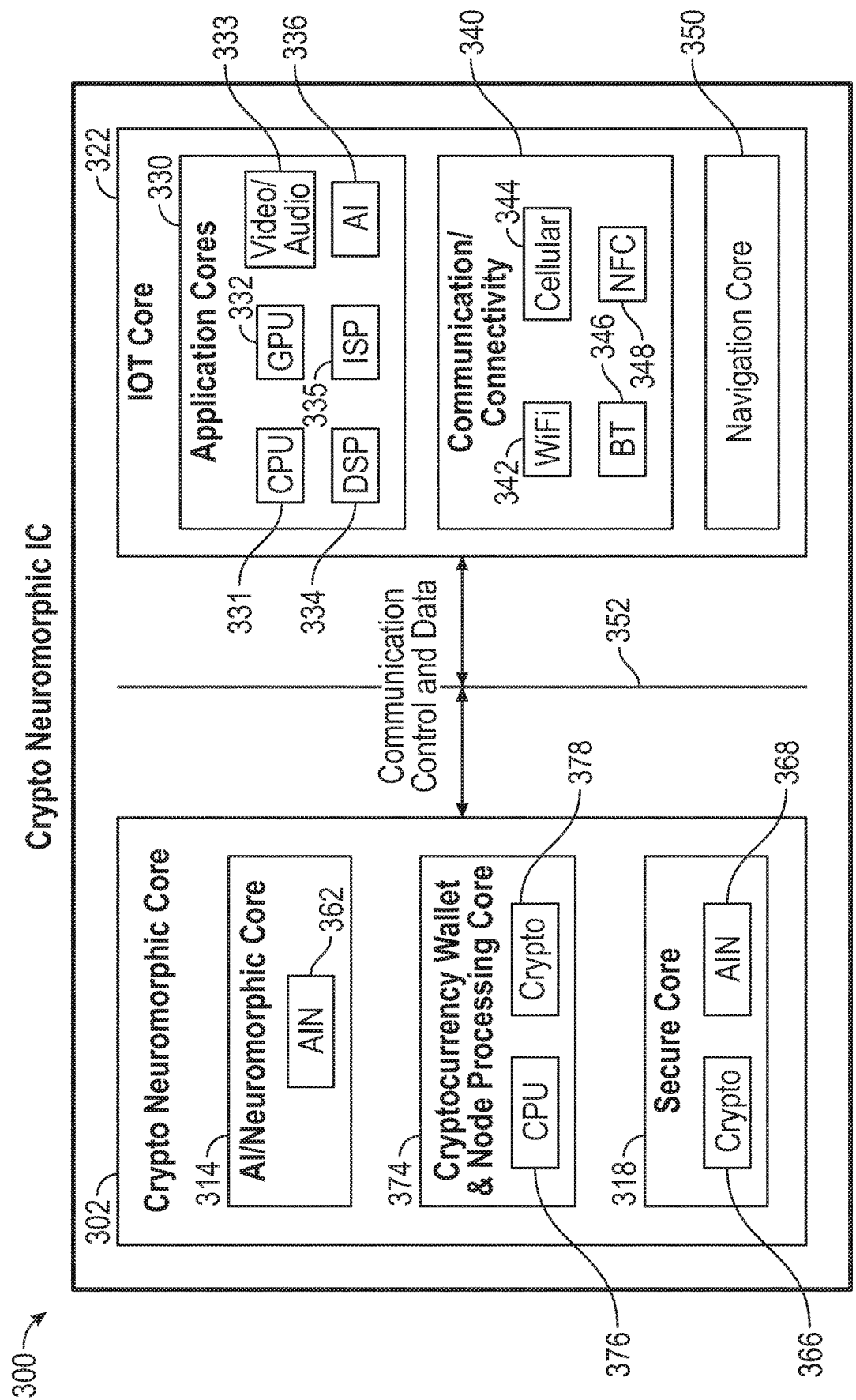

FIG. 3C illustrates an integrated circuit similar to the integrated circuits shown in FIGS. 3A and 3B but with wallet processing core 314 and the cryptocurrency node core 320 combined into cryptocurrency wallet and node processing core 374. In some examples, cryptocurrency wallet and node processing core 374 can include CPU 376 and crypto engine 378, which can correspond to CPU 370 and crypto engine 372 of FIG. 3B. In some examples, cryptocurrency wallet and node processing core 374 can perform any of the functions as wallet processing core 314 and the cryptocurrency node core 320 (e.g., as described above with reference to FIGS. 3A and 3B). The remaining details of FIG. 3C can be the same as those of FIGS. 3A and 3B.

Figure 4:
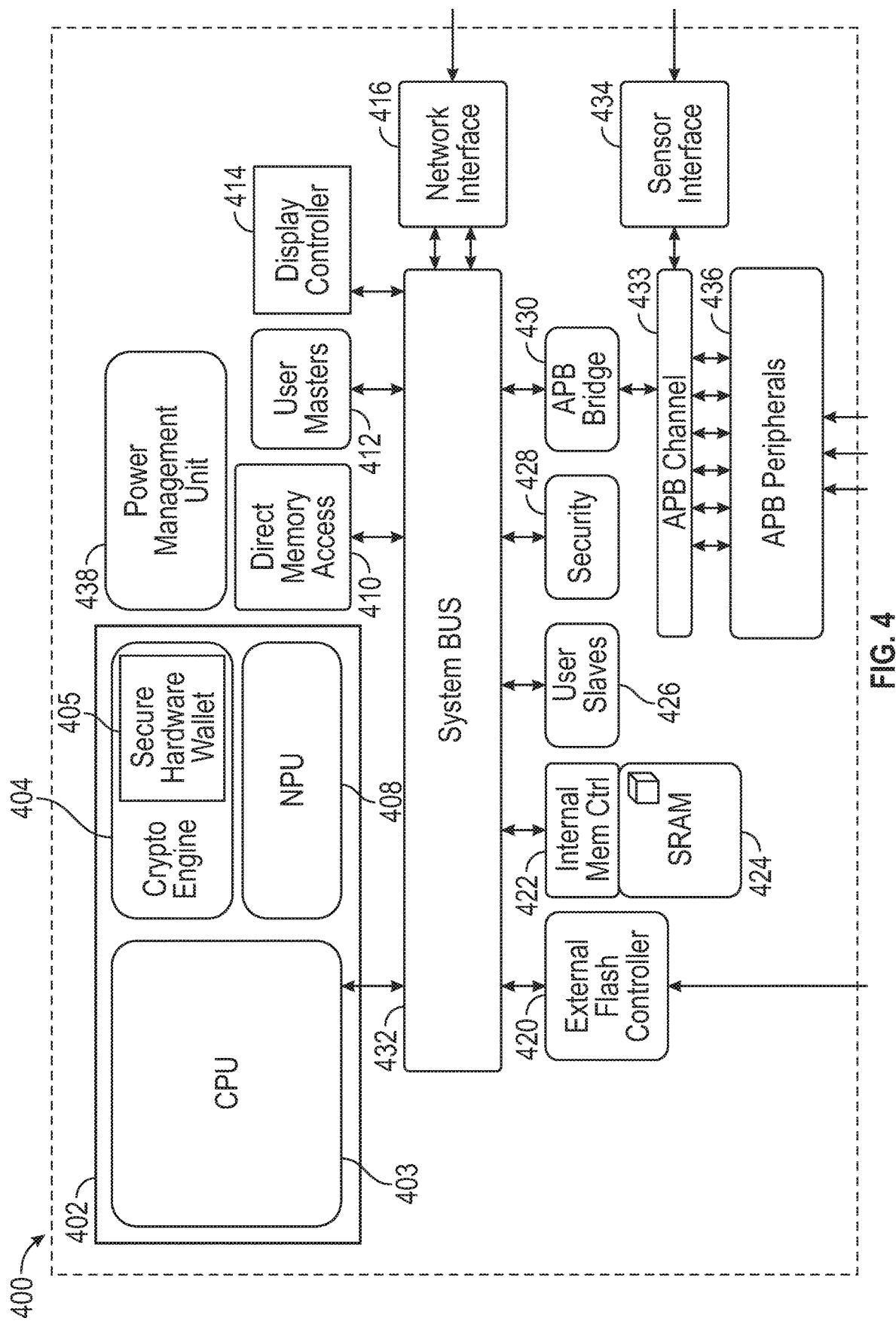
FIG. 4 illustrates an integrated circuit according to examples of the disclosure.

FIG. 4 illustrates integrated circuit 400 according to examples of the disclosure. In some examples, integrated circuit can include a crypto neuromorphic core 402 that comprises CPU 403, crypto engine 404, and NPU 408. In some examples, CPU 403 can include one or more processors for running an operating system and/or performing any method disclosed in this disclosure. In some examples, crypto neuromorphic core 402 can communicate with the rest of the integrated circuit through system bus 432 (e.g., an AHB or AXI interconnect).

In some examples, crypto engine 404 can perform any cryptographic functions (e.g., encryption, decryption, hashing), distributed consensus operations (e.g., performing proof of work and/or proof of stake operations to validate transactions for mining), or any other blockchain operations (e.g., run a DApp, run a light client, add transactions/data to a blockchain). For example, crypto engine 404 can serve as a blockchain accelerator for CPU 403. In some examples, CPU 403 can have access to the crypto engine through a secure API and secure communication channel. In some examples, crypto engine 404 can include a secure hardware wallet 406 to store private keys and/or tokens. In some examples, secure hardware wallet 406 can correspond to a secure memory (e.g., a ROM) accessible only to CPU 403 and NPU 408 (e.g., is not accessible outside of crypto neuromorphic core 402). In some examples, crypto engine can provide many services through its API including certified cryptographic libraries, MiFARE Plus and MiFARE DESFire libraries, hardware security features, it optionally operates in tandem with NPU 408 and/or biometric processing engines for user authentication; addresses the security certifications including common criteria up to EAL6+, EMVCo, and CUP; can support MiFARE Classic/DESFir/Plus, Cryptographic support, message digest (e.g., RIPEMD160, SHA224, SHA256, SHA384, SHA512, SHA3, SHA3-XOF, KECCAK), cryptography key generation (e.g., DES (64, 128,192 bits), AES (128 bits), ECC (256 bits), RSA (1024, 2048, 3072,4096 bits)), RSA encryption with PKCS1 v1.5, PKCS1 OEAP, NOPAD schemes, HMAC signatures (e.g., HMAC-SHA256, HMAC-SHA512), RSA signature with PKCS1 v1.5, PKCS1 PSS schemes, Elliptic Curve Signatures (e.g., ECDSA/EC-Schnorr (SECP256K1, SECP256R1, Brainpool256R1, Brainpool256T1), EdDSA (Ed25519)), Elliptic Curve Diffie Hellman (e.g., ECDH (SECP256K1, SECP256R1, Brainpool256R1, Brainpool256T1, Curve25519)), symmetric cryptography (e.g., DES, Triple-DES, AES with ISO9797M1, ISO9797M2, NOPAD schemes), random number generation (e.g., RND, Prime RND (hardware support TRNG)); work to validate operations performed and multifactor authentication (pin, passphrase, biometric authentication, etc.); private key recovery; supports cryptographic libraries; trusted and user mode of operation of the software running on the node using hypervisors; secure boot ROM to build a chain of trust; physically unclonable functions (PUF) to prevent device duplication; tamper detection at the chip level with RAM clear and key erasure; protection against grey market; FIPS140-2 level 3 or more; and security certification including EU common criteria certification. In some examples, crypto engine can correspond to cryptocurrency wallet and node processing core 374 of FIG. 3B but with secure hardware wallet 406 contained within it. In some examples, secure hardware wallet 406 can correspond to secure core 318.

In some examples, NPU 408 can serve as a machine learning accelerator for CPU 403. In some examples, NPU 408 can correspond to AI/neuromorphic core 314 of FIGS. 3A-3C and/or NPU 362 of FIGS. 3B-3C.

In some examples, integrated circuit 400 can also include a direct memory access controller for allowing access to main system memory (e.g., RAM) via system bus 432. In some examples, a user masters unit 412 can be coupled to the system bus 432 for managing one or more master processes. In some examples, a display controller 414 can coupled to bus 432 to receive data to be displayed on a display device. In some examples, network interface 416 (e.g., radio baseband interface, a transceiver) can be coupled to bus 432 for performing any of the networking operations (e.g., transmitting and/or receiving Wi-Fi, Bluetooth, and/or ZigBee data) and/or communications (e.g., internet communications, encrypted messaging, email, text, phone calls) described with reference to FIGS. 1 and 3-7. In some examples, an external flash controller 420 can be coupled to bus 432 for memory management of any external flash memory coupled to integrated circuit 400. In some examples, an internal memory controller 422 can be coupled to bus 432 to manage SRAM 424. In some examples, a user slaves unit 426 can be coupled to the system bus 432 for managing one or more slave processes. In some examples, security unit 428 can be coupled to bus 432 to manage all security protocols (including certified cryptographic libraries, MiFARE Plus and MiFARE DESFire libraries, hardware security features, it optionally operates in tandem with NPU 408 and/or biometric processing engines for user authentication; addresses the security certifications including common criteria up to EAL6+, EMVCo, and CUP; can support MiFARE Classic/DESFir/Plus, Cryptographic support, message digest (e.g., RIPEMD160, SHA224, SHA256, SHA384, SHA512, SHA3, SHA3-XOF, KECCAK), cryptography key generation (e.g., DES (64, 128,192 bits), AES (128 bits), ECC (256 bits), RSA (1024, 2048, 3072,4096 bits)), RSA encryption with PKCS1 v1.5, PKCS1 OEAP, NOPAD schemes, HMAC signatures (e.g., HMAC-SHA256, HMAC-SHA512), RSA signature with PKCS1 v1.5, PKCS1 PSS schemes, Elliptic Curve Signatures (e.g., ECDSA/EC-Schnorr (SECP256K1, SECP256R1, Brainpool256R1, Brainpool256T1), EdDSA (Ed25519)), Elliptic Curve Diffie Hellman (e.g., ECDH (SECP256K1, SECP256R1, Brainpool256R1, Brainpool256T1, Curve25519)), symmetric cryptography (e.g., DES, Triple-DES, AES with ISO9797M1, ISO9797M2, NOPAD schemes), random number generation (e.g., RND, Prime RND (hardware support TRNG)); work to validate operations performed and multifactor authentication (pin, passphrase, biometric authentication, etc.); private key recovery; supports cryptographic libraries; trusted and user mode of operation of the software running on the node using hypervisors; secure boot ROM to build a chain of trust; physically unclonable functions (PUF) to prevent device duplication; tamper detection at the chip level with RAM clear and key erasure; protection against grey market; FIPS140-2 level 3 or more; and security certification including EU common criteria certification). In some examples, an Advanced Peripheral Bus (APB) bridge 430 can be couple to system bus 432 and to an APB channel bus 433. In some examples, APB channel bus 433 interphases with a sensor interface 434, which can be coupled to one or more sensors (e.g., pressure, temperature, motion, radar, LIDAR, accelerometers, gyroscopes, magnetometers, or any other sensors). In some examples, APB channel bus 433 interfaces with one or more APB peripherals 436 (e.g., I2C, SPI, Timers, GPIO).

Figure 5:
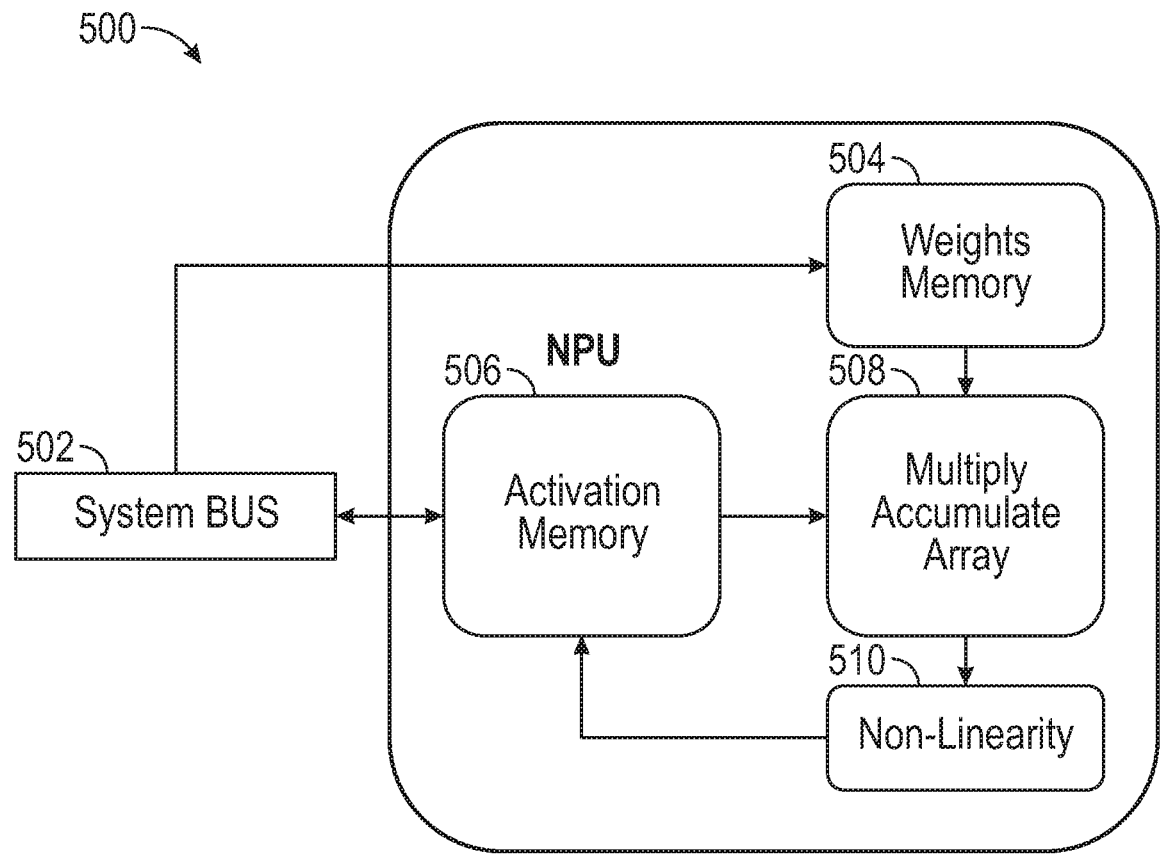
FIG. 5 illustrates an NPU block diagram according to examples of the disclosure.

FIG. 5 illustrates NPU block diagram 500 according to examples of the disclosure. In some examples, local memories for neuron weights from one or more models to be run will be fed from system bus 502 to weights memory 504. In some examples, activation memory 506 is a local inter-layer memory for activations that holds input data (e.g., full images, patches, of batches of images or patches) from the system bus 504 for the multiply accumulate array 508. In some examples, the multiply accumulate array 508 processes each layer in the network for the input data and the non-linearity unit 510 applies non-linearity to each layer. In some examples, the output of the non-linearity unit 510 is stored back to the activation memory 506 for input to the next layer in the neural network. At the end of the network, the final result can be stored in activation memory 506 where a processor can fetch it via system bus 502. In some examples, DApps can be built with integrated learning using NPU 500.

Figure 6:
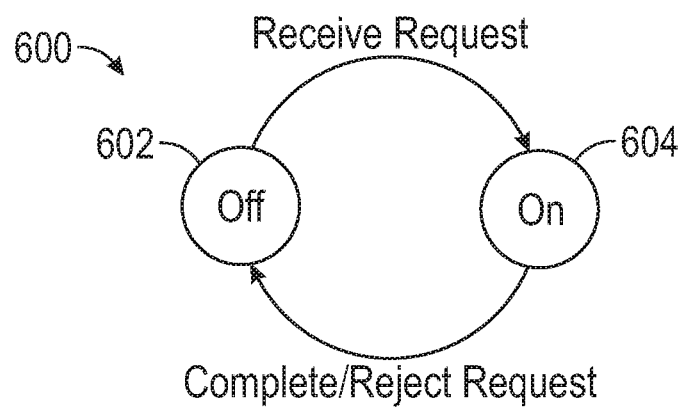
FIG. 6 illustrates a state diagram for operating a core according to examples of the disclosure.

FIG. 6 illustrates state diagram 600 for operating a core according to examples of the disclosure. FIG. 6 illustrates two states: "off" state 602 and "on" state 604. In the on state 604, the core can be powered on and be fully functionally (e.g., perform any of the core processes/functions described with reference to FIGS. 1-5 and 7). In some examples, the on state 604 can refer to a high power mode. In the off state 602, the core can be powered off (e.g., power-gated off), be in a sleep mode, or be in a low power mode (e.g., in mode in which limited functionality is available). By maintaining a core in a low power mode or sleep mode instead of powering it off, processing speeds can be faster because it does not have to boot up. It should be understood that state diagram 600 can control the operation of any of the crypto neuromorphic cores (e.g., crypto neuromorphic core 302 of FIGS. 3A-3C, crypto neuromorphic core 402 of FIG. 4) or sub-cores (e.g., any combination of AI/neuromorphic core 314, wallet processing core 316, secure core 318, and/or cryptocurrency node code 320 of FIGS. 3A-3B, any combination of AI/neuromorphic core 314, cryptocurrency wallet and node processing core 376, and/or secure core 318, any combination crypto engine 404, secure hardware wallet 406, and NPU 408) described above with references to FIGS. 3A-3C and 4. It should be understood that each of the crypto neuromorphic cores or sub-cores described above with references to FIGS. 3A-3C and 4 can be powered separately (e.g., have its power source and/or power management unit).

In some examples, the off state 602 can implement a cold cryptocurrency wallet (e.g., cold storage of private keys and/or cryptocurrency tokens) and the on state 604 can implement a secure hot cryptocurrency wallet. For example, to implement a cold cryptocurrency wallet, the secure core 318 of FIGS. 3A-3C (e.g., as described above with reference to FIG. 3A) or secure hardware wallet 406 of FIG. 4 can be put in the off state. Conversely, to implement a secure hot cryptocurrency wallet, the secure core 318 of FIGS. 3A-3C (e.g., as described above with reference to FIG. 3A) or secure hardware wallet 406 of FIG. 4 can be put in the on state. In other examples, to implement a cold cryptocurrency wallet, wallet processing core 316 of FIGS. 3A-3B or the cryptocurrency wallet and node processing core 376 of FIG. 3B can be put in the off state 602 (e.g., in addition to or instead of the putting the secure core 318 in the off state 602) or crypto engine 404 of FIG. 4 can be put in the off state 602 (e.g., in addition to or instead of putting the secure hardware wallet 406 in the off state 602). Conversely, to implement a secure hot cryptocurrency wallet, in some examples, wallet processing core 316 of FIGS. 3A-3B or the cryptocurrency wallet and node processing core 376 of FIG. 3B can be put in the on state 604 (e.g., in addition to putting the secure core 318 in the on state 604) or crypto engine 404 of FIG. 4 can be put in the on state 604 (e.g., in addition to putting the secure hardware wallet 406 in the on state 604). In other examples, to implement a cold cryptocurrency wallet, crypto neuromorphic core 302 of FIGS. 3A-3B or crypto neuromorphic core 402 of FIG. 4 can be put in the off state 602. Conversely, to implement a secure hot cryptocurrency wallet, in some examples, crypto neuromorphic core 302 of FIGS. 3A-3B or crypto neuromorphic core 402 of FIG. 4 can be put in the on state 604.

In some examples, the default state of a core is the off state 602. In some examples, user input (e.g., the user can manually turn on a core) can trigger the core to enter the on state 604 from the off state 602. Conversely, in some examples, user input can trigger the core to enter the off state 602 from the on state 604 (e.g., the user can manually turn a core off). In other examples, AI/neuromorphic core 313 of FIGS. 3A-3C, AIN 362 of FIGS. 3A-3B, or NPU 408 of FIG. 4 (e.g., each of which herein referred to as an "AI unit") can trigger another core to enter the on state 604 from the off state 602. Conversely, any AI unit can trigger another core to enter the off state 602 from the on state 604. In some examples, successful user authentication (e.g., by entering a passcode or pin or through face recognition, voice recognition, iris or retina scan, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, or fingerprint matching by any AI unit or another core as described above with references to FIGS. 3A-3C and 4) or the transaction is verified (e.g., in accordance with a determination that a service was rendered or product/good was delivered by any AI unit or another core as described above with references to FIGS. 3A-3C and 4) can trigger a core to enter the on state 604 from the off state 602. In some examples, successfully completing a request (e.g., after outputting a requested private key, signing a transaction, or signing data) can trigger a core to enter the off state 602 from the on state 604.

Figure 7:
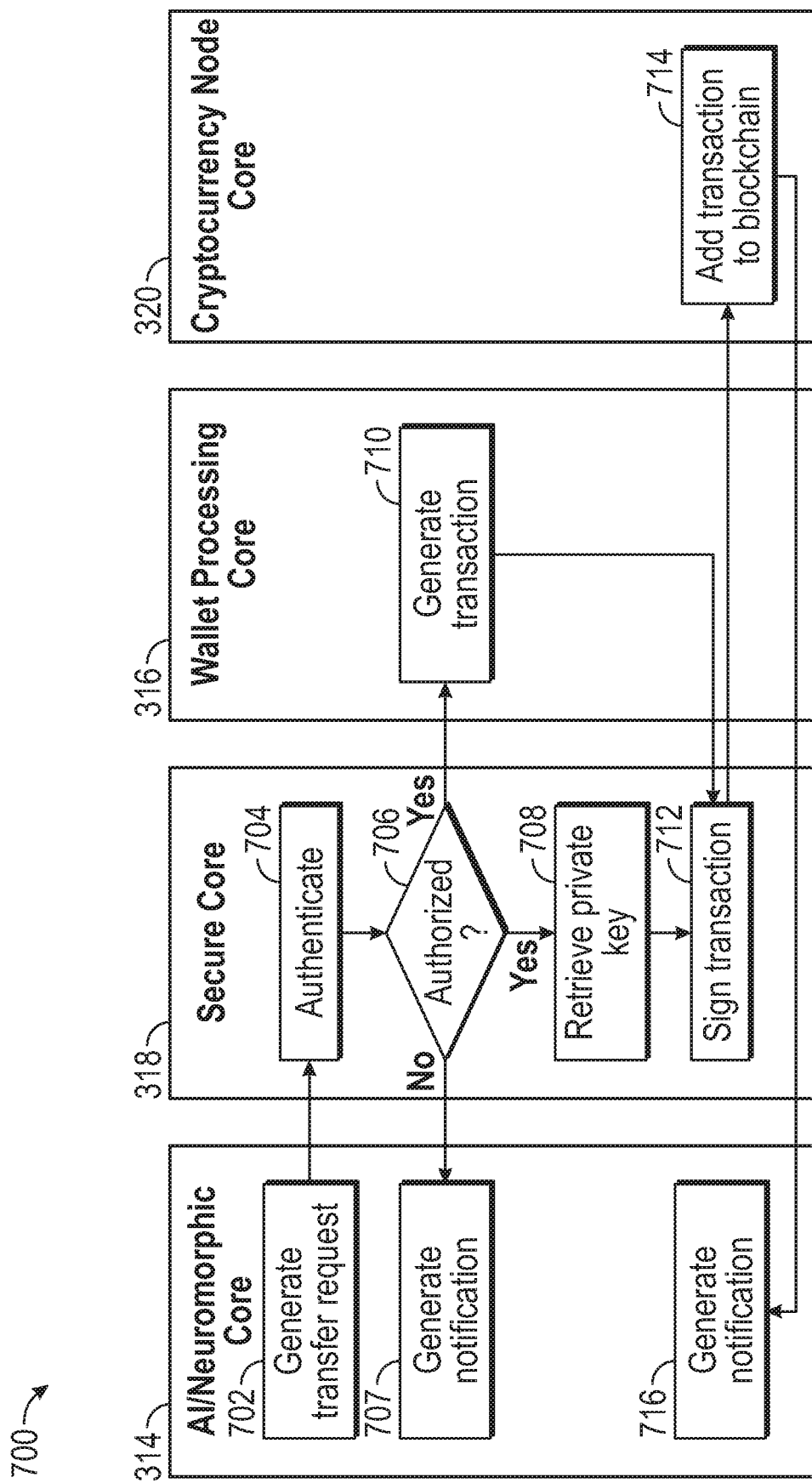
FIG. 7 illustrates a flow chart for transferring tokens according to examples of the disclosure.

FIG. 7 illustrates process 700 for transferring tokens according to examples of the disclosure. Specifically, FIG. 7 shows an example of how the sub-cores within crypto neuromorphic core 302 of FIGS. 3A-3B can interact to transfer tokens from a source wallet to a destination wallet.

At step 702, the AI/Neuromorphic core 314 automatically generates a token transfer request in response to certain criteria being met (e.g., in accordance with a determination that a payment is required, by using pre-installed and/or self learned knowledge using behavioral modeling, face recognition, voice recognition, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, iris recognition, fingerprint matching, etc.) or by receiving requests from other devices. For example, AI/Neuromorphic core 314 can process data from the IoT device's localization sensors and systems (e.g., Navigation Core 350 as described above with reference to FIGS. 3A-3C) and other sensor data (e.g., sound captured by microphone of the IoT device) to determine that the user/IoT device must pay for a good or service (e.g., a vehicle's GPS system can capture information that the vehicle is at a fast food restaurant, one or more microphones in the vehicle can capture the user's order and the teller's total amount due, one or more cameras can capture image data of the user ordering food and/or of the restaurant). In some examples, AI/Neuromorphic core 314 can automatically generate a token transfer request in response to receiving a M2M request. It should be understood that the transfer request (e.g., step 702) can be entered manually by a user (e.g., through I/O interface 208 of FIG. 2). In some examples, the generated request can identify the source wallet (e.g., the public key associated with the wallet, the address of the wallet, or any other wallet identifier), the amount of tokens, and the destination wallet (e.g., the public key associated with the wallet, the address of the wallet, or any other wallet identifier).

At step 704, the transaction is authenticated by secure core 318. In some examples, step 704 can be performed by the AI/neuromorphic core 314. Authentication can be performed by entering a passcode or pin or through face recognition, voice recognition, iris or retina scan, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, or fingerprint matching (e.g., as described above with references to FIGS. 3A-3C, 4, and 6). For example, the AI/neuromorphic core 314 or the secure core 318 can prompt the user to enter a pin or passcode or prompt the user to scan the user's face, one or more eyes, or fingertip at step 704 (e.g., through I/O interface of FIG. 2). In some examples, the AI/neuromorphic core 314 or the secure core 318 can authenticate the user by the user's voice and/or image (e.g., face) captured by one or more sensors (e.g., one or more microphones and/or one or more cameras) without the user having to be prompted to enter authentication (e.g., while ordering his or her food in the fast food restaurant example described above) at step 704. In some examples, the AI/neuromorphic core 314 or the secure core 318 can authenticate the requested transaction by verifying whether the source wallet address contained in the request contains sufficient tokens to complete the request at step 704.

At step 706, the secure core 318 determines whether the user and/or transaction are authorized (e.g., determines whether the user and/or transaction were properly authenticated in step 704). In some examples, step 706 can be performed by the AI/neuromorphic core 314 (e.g., before or after the transfer request is generated). In accordance with a determination that the transaction is not authorized (e.g., the correct passcode or pin was not entered or face recognition, voice recognition, iris or retina scan, gait recognition, or fingerprint matching failed), the crypto neuromorphic core 302 foregoes executing the transaction and the AI/neuromorphic core 314, optionally, generates a notification (e.g., to be presented to the user, the merchant, another device) to indicate the transaction/use was not authorized at step 707. In accordance, with a determination the transaction is authorized (e.g., the correct passcode or pin was entered or face recognition, voice recognition, iris or retina scan, gait recognition, or fingerprint matching was successful), the secure core 314 retrieves the private key from memory (e.g., from ROM) at step 708 and the wallet processing core 316 (concurrently, simultaneously, or serially) generates the transaction to be added to the blockchain (e.g., the transaction to transfer tokens). In some examples, the secure core 314 stores private keys in encrypted form and step 708 includes a step of decrypting the retrieved private key. In some examples, the secure core 314, at step 708, performs a look up operation based on the public key or wallet address contained in the request generated at step 702 to retrieve the requested private key. In some examples, the transaction is generated by the AI/neuromorphic core 314 at step 702 (e.g., the generated request is the transaction itself).

At step 712, the secure core 712 signs the transaction to transfer token using the private key retrieved at step 708 (e.g., encrypts the transaction or adds a digital signature to the transaction). At step 714, the signed transaction is added to the blockchain by the cryptocurrency node core 320. In some examples, the signed transaction is added to the blockchain by the wallet processing core 316. At step 716, the AI/neuromorphic core 314, optionally, generates a notification (e.g., to be presented to the user, the merchant, another device) confirming that the transaction was made.

It should be understood that the process 700 shown in FIG. 7 can be performed by crypto neuromorphic core 302 of FIG. 3C. In that example, steps 710 and 714 can be performed by cryptocurrency wallet and node processing core 374, and the remaining steps would be performed as described above. It should also be understood that the process 700 shown in FIG. 7 can be performed by crypto neuromorphic core 402 of FIG. 4. In that example, NPU 408 or CPU 403 can perform steps 702, 704, 706, 707, 710, and/or 716; crypto engine can perform steps 704, 706, 708, 710, 712, and/or 714; and secure hardware wallet 405 can perform steps 704, 706, 708, and/or 712.

Figure 8:
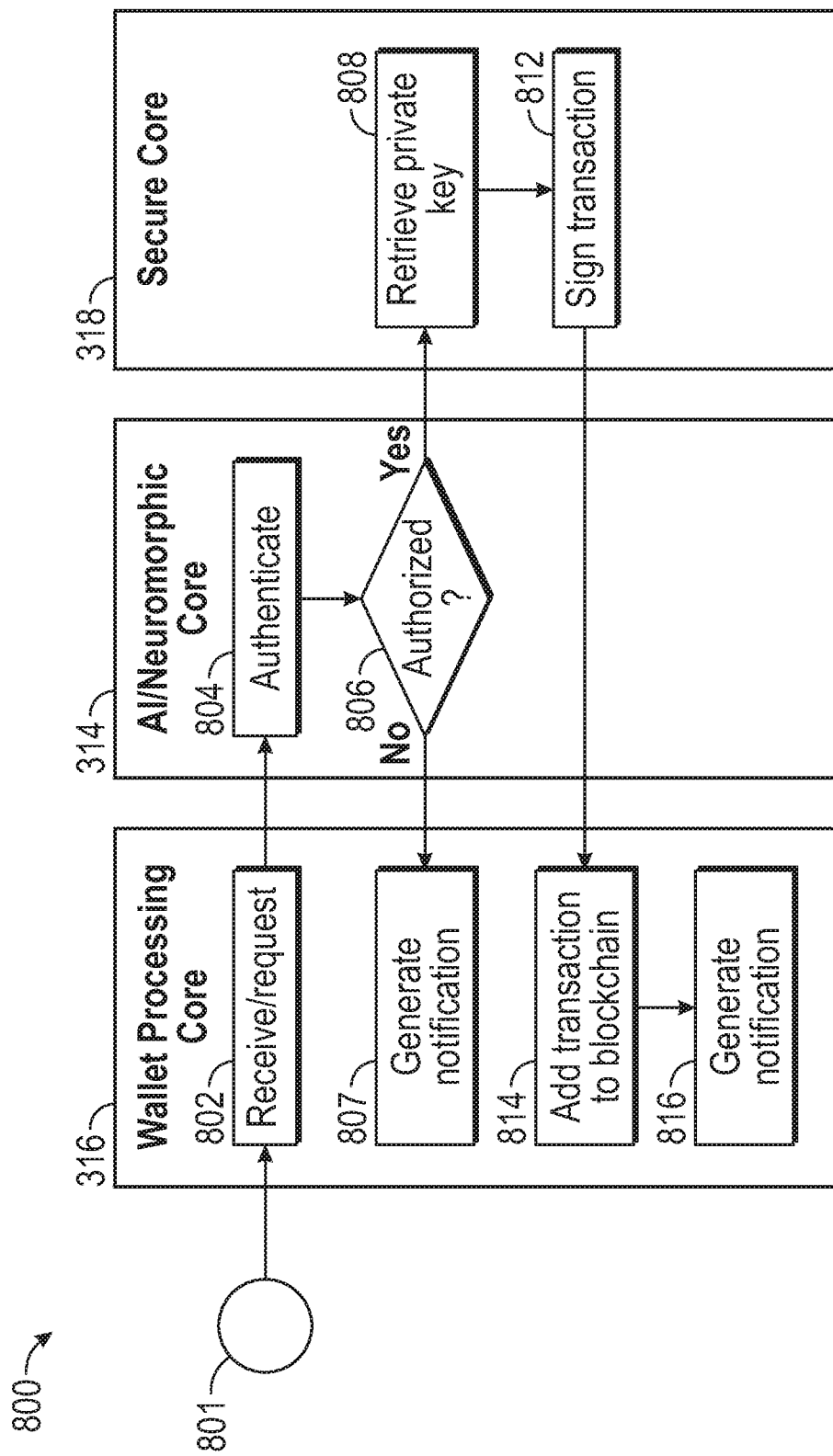
FIG. 8 illustrates a flow chart for transferring tokens according to examples of the disclosure.

FIG. 8 illustrates process 800 for transferring tokens according to examples of the disclosure. Specifically, FIG. 8 shows an example of how a neuromorphic core with a wallet processing core 316, AI/Neuromorphic core 314, and secure core 318 can interact with an outside module 801 (e.g., an electronic device, a website, a web service, a parking meter, a vending machine, an autonomous driving car, a charging station) to transfer tokens from a source wallet to a destination wallet corresponding to the that outside module 801.

At step 802, the wallet processing core 316 interacts with outside module 801 and receives a transfer token request (e.g., a M2M request). In some examples, wallet processing core 316 interacts with outside module 801 through a network interface (e.g., network interface 210 of FIG. 2) in a peer-to-peer fashion. In some examples, wallet processing core 316 can generate a transaction to transfer the requested tokens at step 802. In some examples, module 801 can only interact with the wallet processing core 316. In some examples, wallet processing core 316 can communicate (e.g., via a bus) the transaction and/or transfer request with the AI/Neuromorphic core 314. In some examples, the transfer request and/or generated transaction can identify the source wallet (e.g., the public key associated with the wallet, the address of the wallet, or any other wallet identifier), the amount of tokens, and the destination wallet (e.g., the public key associated with the wallet, the address of the wallet, or any other wallet identifier).

At step 804, the transaction is authenticated by AI/neuromorphic core 314. In some examples, step 804 can be performed by the secure core 318. Authentication can be performed by entering a passcode or pin or through face recognition, voice recognition, iris or retina scan, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, or fingerprint matching (e.g., as described above with references to FIGS. 3A-3C, 4, and 6). For example, the AI/neuromorphic core 314 or the secure core 318 can prompt the user to enter a pin or passcode or prompt the user to scan the user's face, one or more eyes, or fingertip at step 804 (e.g., through I/O interface of FIG. 2). In some examples, the AI/neuromorphic core 314 can perform user authentication by using pre-installed and/or self learned knowledge using behavioral modeling, face recognition, voice recognition, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, iris recognition, fingerprint matching, etc. For example, the AI/neuromorphic core 314 or the secure core 318 can authenticate the user by the user's voice and/or image (e.g., face) captured by one or more sensors (e.g., one or more microphones and/or one or more cameras) without the user having to be prompted to enter authentication (e.g., while ordering his or her food in the fast food restaurant example described above) at step 804. In some examples, the AI/neuromorphic core 314 or the secure core 318 can authenticate the requested transaction by verifying whether the source wallet address contained in the request contains sufficient tokens to complete the request at step 804.

At step 806, the AI/neuromorphic core 314 determines whether the user and/or transaction are authorized (e.g., determines whether the user and/or transaction were properly authenticated in step 804). In some examples, step 806 can be performed by the secure core 318. In accordance with a determination that the transaction is not authorized (e.g., the correct passcode or pin was not entered or face recognition, voice recognition, iris or retina scan, gait recognition, or fingerprint matching failed), the crypto neuromorphic core 302 foregoes executing the transaction and the wallet processing core 316 (or, in some examples, the AI/neuromorphic core 316), optionally, generates a notification (e.g., to be presented to the user, the merchant, another device) to indicate the transaction/use was not authorized at step 807. In accordance, with a determination the transaction is authorized (e.g., the correct passcode or pin was entered or face recognition, voice recognition, iris or retina scan, gait recognition, or fingerprint matching was successful), the secure core 314 retrieves the private key from memory (e.g., from ROM) at step 808. In some examples, the secure core 314 stores private keys in encrypted form and step 808 includes a step of decrypting the retrieved private key. In some examples, the secure core 314, at step 808, performs a look up operation based on the public key or wallet address contained in the request received at step 802 to retrieve the requested private key.

At step 812, the secure core 318 signs the transaction to transfer token using the private key retrieved at step 808 (e.g., encrypts the transaction or adds a digital signature to the transaction). At step 814, the signed transaction is added to the blockchain by the wallet processing core 316. At step 816, the wallet processing core 316, optionally, generates a notification (e.g., to be presented to the user, the merchant, another device) confirming that the transaction was made.

It should be understood that the process 800 shown in FIG. 8 can be performed by crypto neuromorphic core 302 of FIG. 3C. In that example, steps 802, 807, 814, and 816 can be performed by cryptocurrency wallet and node processing core 374, and the remaining steps would be performed as described above. It should also be understood that the process 800 shown in FIG. 8 can be performed by crypto neuromorphic core 402 of FIG. 4. In that example, NPU 408 or CPU 403 can perform steps 802, 804, 806, 807, and/or 816; crypto engine can perform steps 804, 806, 808, 812, and/or 814; and secure hardware wallet 405 can perform steps 804, 806, 808, and/or 812.

Figure 9:
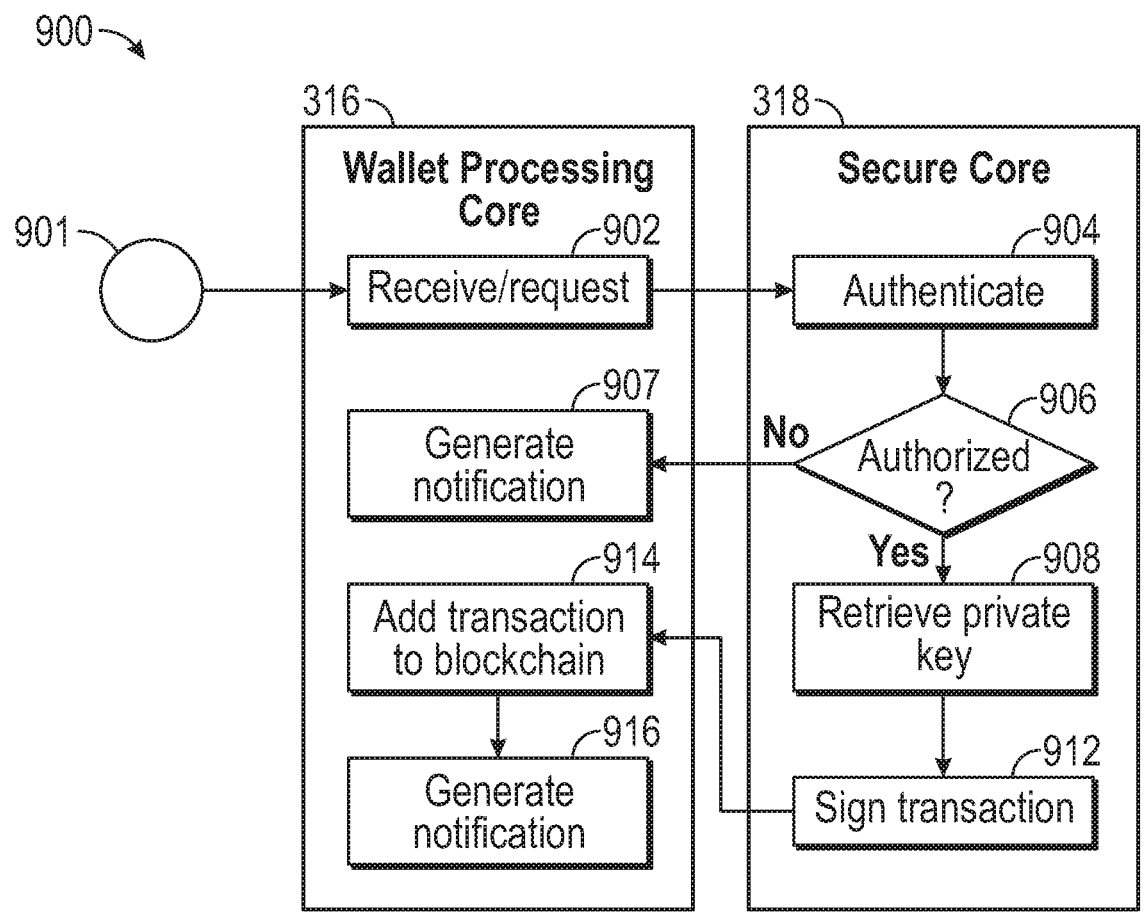
FIG. 9 illustrates a flow chart for transferring tokens according to examples of the disclosure.

FIG. 9 illustrates process 900 for transferring tokens according to examples of the disclosure. Specifically, FIG. 9 shows an example of how a neuromorphic core with a wallet processing core 316 and secure core 318 can interact with an outside module 901 (e.g., an electronic device, a website, a web service, a parking meter, a vending machine, an autonomous driving car, a charging station) to transfer tokens from a source wallet to a destination wallet corresponding to the that outside module 901.

At step 902, the wallet processing core 316 interacts with outside module 801 and receives a transfer token request (e.g., a M2M request). In some examples, wallet processing core 316 interacts with outside module 901 through a network interface (e.g., network interface 210 of FIG. 2) in a peer-to-peer fashion. In some examples, wallet processing core 316 can generate a transaction to transfer the requested tokens at step 902. In some examples, module 901 can only interact with the wallet processing core 316. In some examples, wallet processing core 316 can communicate (e.g., via a bus) the transaction and/or transfer request with the secure core 318. In some examples, the transfer request and/or generated transaction can identify the source wallet (e.g., the public key associated with the wallet, the address of the wallet, or any other wallet identifier), the amount of tokens, and the destination wallet (e.g., the public key associated with the wallet, the address of the wallet, or any other wallet identifier).

At step 904, the transaction is authenticated by secure core 318. Authentication can be performed by entering a passcode or pin or through face recognition, voice recognition, iris or retina scan, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, or fingerprint matching, or a combination (e.g., as described above with references to FIGS. 3A-3C, 4, and 6). For example, the secure core 318 can prompt the user to enter a pin or passcode or prompt the user to scan the user's face, one or more eyes, or fingertip at step 904 (e.g., through I/O interface of FIG. 2). In some examples, the secure core 318 can authenticate the user by the user's voice and/or image (e.g., face) or by the user's walking patterns captured by one or more sensors (e.g., one or more microphones and/or one or more cameras) without the user having to be prompted to enter authentication (e.g., while ordering his or her food in the fast food restaurant example described above) at step 904. In some examples, the secure core 318 can authenticate the requested transaction by verifying whether the source wallet address contained in the request contains sufficient tokens to complete the request at step 904.

At step 906, the secure core 318 determines whether the user and/or transaction are authorized (e.g., determines whether the user and/or transaction were properly authenticated in step 904). In accordance with a determination that the transaction is not authorized (e.g., the correct passcode or pin was not entered or face recognition, voice recognition, iris or retina scan, gait recognition, or fingerprint matching failed), the crypto neuromorphic core 302 foregoes executing the transaction and the wallet processing core 316, optionally, generates a notification (e.g., to be presented to the user, the merchant, another device) to indicate the transaction/use was not authorized at step 907. In accordance, with a determination the transaction is authorized (e.g., the correct passcode or pin was entered or face recognition, voice recognition, iris or retina scan, gait recognition, or fingerprint matching was successful), the secure core 314 retrieves the private key from memory (e.g., from ROM) at step 908. In some examples, the secure core 314 stores private keys in encrypted form and step 908 includes a step of decrypting the retrieved private key. In some examples, the secure core 314, at step 908, performs a look up operation based on the public key or wallet address contained in the request received at step 902 to retrieve the requested private key.

At step 912, the secure core 318 signs the transaction to transfer token using the private key retrieved at step 908 (e.g., encrypts the transaction or adds a digital signature to the transaction). At step 914, the signed transaction is added to the blockchain by the wallet processing core 316. At step 916, the wallet processing core 316, optionally, generates a notification (e.g., to be presented to the user, the merchant, another device) confirming that the transaction was made.

It should be understood that the process 900 shown in FIG. 9 can be performed by crypto neuromorphic core 302 of FIG. 3C. In that example, steps 902, 907, 914, and 916 can be performed by cryptocurrency wallet and node processing core 374, and the remaining steps would be performed as described above. It should also be understood that the process 900 shown in FIG. 8 can be performed by crypto neuromorphic core 402 of FIG. 4. In that example, NPU 408 or CPU 403 can perform steps 902, 904, 906, 907, and/or 916; crypto engine can perform steps 904, 906, 908, 912, and/or 914; and secure hardware wallet 405 can perform steps 904, 906, 908, and/or 912.

Thus, the examples of the disclosure provide various integrated circuits to allow IoT devices to interact with distributed ledgers.

Therefore, according to the above, some examples of the disclosure are directed to an integrated circuit comprising: a central processing unit coupled to a system bus; a network interface configured to interface with an external device; and a crypto neuromorphic core coupled to the system bus, the crypto neuromorphic core comprising a processor, an internal bus, and a non-transitory computer-readable memory, wherein the crypto neuromorphic core is configured to: store a private key in the non-transitory computer-readable memory accessible to the crypto neuromorphic core but not accessible to the central processing unit and the network interface; add first data to a blockchain using the private key via the network interface; and read second data from the blockchain via the network interface. Additionally or alternatively to one or more of the examples disclosed above, in some examples, the crypto neuromorphic core is configured to operate as either a cold cryptographic wallet or a hot cryptographic wallet, wherein the private key are not accessible to the crypto neuromorphic core when operating as the cold cryptographic wallet and the private key are accessible to the crypto neuromorphic core when operating as the hot cryptographic wallet. Additionally or alternatively to one or more of the examples disclosed above, in some examples, the crypto neuromorphic core powers off when operating as the cold cryptographic wallet. Additionally or alternatively to one or more of the examples disclosed above, in some examples, the crypto neuromorphic core enters a sleep mode when operating as the cold cryptographic wallet. Additionally or alternatively to one or more of the examples disclosed above, in some examples, the crypto neuromorphic core enters a low power mode when operating as the cold cryptographic wallet and enters a high power mode when operating as the hot cryptographic wallet. Additionally or alternatively to one or more of the examples disclosed above, in some examples, the crypto neuromorphic core further comprises: a wallet processing core comprising a processor, the wallet processing core configured to receive and transfer cryptocurrency tokens on the blockchain; a secure core comprising the non-transitory computer-readable memory to store the private key; and a cryptocurrency node core comprising a processor, the cryptocurrency node core configured to: add the first data to the blockchain using the private key via the network interface; read the second data to the blockchain via the network interface; and perform distributed consensus operations, including proof of work operations and proof of stake operations. Additionally or alternatively to one or more of the examples disclosed above, in some examples, the crypto neuromorphic core further comprises: an artificial intelligence (AI) neuromorphic core comprising a NPU, wherein the AI neuromorphic core is configured to: operate the crypto neuromorphic core as the cold cryptographic wallet or as the hot cryptographic wallet. Additionally or alternatively to one or more of the examples disclosed above, in some examples, the AI neuromorphic core is further configured to: power off the secure core while operating the crypto neuromorphic core as the cold cryptographic wallet; and power on the secure core while operating the crypto neuromorphic core as the hot cryptographic wallet. Additionally or alternatively to one or more of the examples disclosed above, in some examples, adding first data to the blockchain using the private key comprises: retrieving, by the secure core, the private key associated with the first data from the non-transitory computer-readable memory; signing, by the secure core, the first data with the private key retrieved from the non-transitory computer-readable memory; and adding, by the cryptocurrency node core, the signed first data to the blockchain via the network interface. Additionally or alternatively to one or more of the examples disclosed above, in some examples, the crypto neuromorphic core is isolated from the central processing unit and the network interface via the system bus, the crypto neuromorphic core runs its own operating system. Additionally or alternatively to one or more of the examples disclosed above, in some examples, the crypto neuromorphic core is further configured to: contain a secure core comprising a secure processor and the non-transitory computer-readable memory, wherein the non-transitory computer-readable memory is a dedicated/protected memory; and store the private key in the dedicated/protected memory accessible to the secure core but not accessible to other components of the crypto neuromorphic core, the central processing unit, and the network interface.

Some examples of the disclosure are directed to a method comprising: at a first electronic device comprising a central processing unit and an integrated circuit comprising a crypto neuromorphic core for transferring tokens from a source cryptographic wallet to a destination: generating a transfer request including a destination identifier of the destination on a blockchain, a source identifier of the source cryptographic wallet on the blockchain corresponding to the first electronic device, and a token amount; authenticating the transfer request; in accordance with a determination that the transfer request is authorized: retrieving a source private key associated with the source identifier of the source cryptographic wallet from a non-transitory computer-readable memory within the crypto neuromorphic core, wherein the non-transitory computer-readable memory is accessible to the crypto neuromorphic core but not accessible to the central processing unit; generating a transaction transferring the token amount from the source cryptographic wallet to the destination; signing the transaction using the source private key; and adding the transaction to the blockchain; and in accordance with a determination that the transfer request is not authorized, forgoing completing the transfer request. Additionally or alternatively to one or more of the examples disclosed above, in some examples, the destination is a destination cryptographic wallet and the transfer request is generated by a user of the first electronic device. Additionally or alternatively to one or more of the examples disclosed above, in some examples, the destination is a destination cryptographic wallet and the transfer request is generated by an artificial intelligence (AI) neuromorphic core within the crypto neuromorphic core, wherein the AI neuromorphic core comprises a NPU. Additionally or alternatively to one or more of the examples disclosed above, in some examples, the transfer request is generated by the AI neuromorphic core in response to sensor input. Additionally or alternatively to one or more of the examples disclosed above, in some examples, the sensor input comprises one or more of location information, sound information, or visual information. Additionally or alternatively to one or more of the examples disclosed above, in some examples, the transfer request is generated by the AI neuromorphic core without user input. Additionally or alternatively to one or more of the examples disclosed above, in some examples, the transfer request is generated in response to receiving a request for tokens from a second electronic device.

Some examples of the disclosure are directed to a first electronic device comprising: a central processing unit coupled to a system bus; a network interface configured to interface with an external device; and an integrated circuit comprising with a crypto neuromorphic core, for transferring tokens from a source cryptographic wallet to a destination, the crypto neuromorphic core configured to perform a method comprising: generating a transfer request including a destination identifier of the destination on a blockchain, a source identifier of the source cryptographic wallet on the blockchain corresponding to the first electronic device, and a token amount; authenticating the transfer request; in accordance with a determination that the transfer request is authorized: retrieving a source private key associated with the source identifier of the source cryptographic wallet from a non-transitory computer-readable memory within the crypto neuromorphic core; generating a transaction transferring the token amount from the source cryptographic wallet to the destination; signing the transaction using the source private key; and adding the transaction to the blockchain; and in accordance with a determination that the transfer request is not authorized; forgoing completing the transfer request. Additionally or alternatively to one or more of the examples disclosed above, in some examples, the destination is a destination cryptographic wallet and the transfer request is generated by an artificial intelligence (AI) neuromorphic core within the crypto neuromorphic core, wherein the AI neuromorphic core comprises a NPU. Additionally or alternatively to one or more of the examples disclosed above, in some examples, the transfer request is generated by the AI neuromorphic core in response to sensor input. Additionally or alternatively to one or more of the examples disclosed above, in some examples, the transfer request is generated by the AI neuromorphic core without user input. Additionally or alternatively to one or more of the examples disclosed above, in some examples, the determination that the transfer request is authorized includes the crypto neuromorphic core authenticating a user of the first electronic device. Additionally or alternatively to one or more of the examples disclosed above, in some examples, the crypto neuromorphic core including a wallet processing core comprising a processor and an I/O interface; and the wallet processing core authenticates the user of the first electronic device through requests via the I/O interface. Additionally or alternatively to one or more of the examples disclosed above, in some examples, the AI neuromorphic core generates transfer request using behavioral modeling, face recognition, voice recognition, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, iris recognition, or fingerprint matching. Additionally or alternatively to one or more of the examples disclosed above, in some examples, the determination that the transfer request is authorized includes the AI neuromorphic core authenticating a user of the first electronic device using behavioral modeling, face recognition, voice recognition, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, iris recognition, or fingerprint matching.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The present invention is described above with reference to preferred embodiments. The invention, however, is not limited to the embodiments described and depicted herein. Rather the invention is limited only by the claims appended hereto. The use herein of "including," "comprising," "having," "containing," "involving," and variations thereof is meant to encompass the items listed thereafter and equivalents thereof as well as additional items and do not preclude the presence or addition of one or more other features, integers, processes, operations, elements, components, and/or groups thereof. As used herein, the singular forms "a", "an" and "the" are intended to include the plural forms as well, unless the context clearly indicates otherwise.

The invention claimed is:

1. An integrated circuit comprising:
   a central processing unit coupled to a system bus;
   a network interface configured to interface with an external device; and
   a crypto neuromorphic core coupled to the system bus, the crypto neuromorphic core comprising a processor, an internal bus, and a non-transitory computer-readable memory,
   wherein the crypto neuromorphic core is configured to:
      store a private key in the non-transitory computer-readable memory accessible to the crypto neuromorphic core but not accessible to the central processing unit and the network interface;
      add first data to a blockchain using the private key via the network interface; and
      read second data from the blockchain via the network interface, wherein:
   the crypto neuromorphic core is configured to operate as either a cold cryptographic wallet or a hot cryptographic wallet,
   the private key are not accessible to the crypto neuromorphic core when operating as the cold cryptographic wallet and the private key are accessible to the crypto neuromorphic core when operating as the hot cryptographic wallet, and
   the crypto neuromorphic core enters a low power mode when operating as the cold cryptographic wallet and enters a high power mode when operating as the hot cryptographic wallet.

2. The integrated circuit of claim 1, wherein the crypto neuromorphic core powers off when operating as the cold cryptographic wallet.

3. The integrated circuit of claim 1, wherein the crypto neuromorphic core enters a sleep mode when operating as the cold cryptographic wallet.

4. The integrated circuit of claim 1, wherein the crypto neuromorphic core is isolated from the central processing unit and the network interface via the system bus, the crypto neuromorphic core runs its own operating system.

5. The integrated circuit of claim 4, wherein the crypto neuromorphic core is further configured to:
   contain a secure core comprising a secure processor and the non-transitory computer-readable memory, wherein the non-transitory computer-readable memory is a dedicated/protected memory; and
   store the private key in the dedicated/protected memory accessible to the secure core but not accessible to other components of the crypto neuromorphic core, the central processing unit, and the network interface.

6. The integrated circuit of claim 1, wherein the crypto neuromorphic core further comprises:
   a wallet processing core comprising a processor, the wallet processing core configured to receive and transfer cryptocurrency tokens on the blockchain;
   a secure core comprising the non-transitory computer-readable memory to store the private key; and
   a cryptocurrency node core comprising a processor, the cryptocurrency node core configured to:
      add the first data to the blockchain using the private key via the network interface;

read the second data to the blockchain via the network interface; and perform distributed consensus operations, including proof of work operations and proof of stake operations.

7. The integrated circuit of claim 6, wherein the crypto neuromorphic core further comprises:

an artificial intelligence (AI) neuromorphic core comprising a neural processing unit (NPU), wherein the AI neuromorphic core is configured to:

operate the crypto neuromorphic core as the cold cryptographic wallet or as the hot cryptographic wallet.

8. The integrated circuit of claim 7, wherein the AI neuromorphic core is further configured to:

power off the secure core while operating the crypto neuromorphic core as the cold cryptographic wallet; and power on the secure core while operating the crypto neuromorphic core as the hot cryptographic wallet.

9. The integrated circuit of claim 7, wherein adding first data to the blockchain using the private key comprises:

retrieving, by the secure core, the private key associated with the first data from the non-transitory computer-readable memory;

signing, by the secure core, the first data with the private key retrieved from the non-transitory computer-readable memory; and adding, by the cryptocurrency node core, the signed first data to the blockchain via the network interface.

10. A method comprising:

at a first electronic device comprising a central processing unit and an integrated circuit comprising a crypto neuromorphic core for transferring tokens from a source cryptographic wallet to a destination:

generating a transfer request including a destination identifier of the destination on a blockchain, a source identifier of the source cryptographic wallet on the blockchain corresponding to the first electronic device, and a token amount;

authenticating the transfer request;

in accordance with a determination that the transfer request is authorized:

retrieving a source private key associated with the source identifier of the source cryptographic wallet from a non-transitory computer-readable memory within the crypto neuromorphic core, wherein the non-transitory computer-readable memory is accessible to the crypto neuromorphic core but not accessible to the central processing unit;

generating a transaction transferring the token amount from the source cryptographic wallet to the destination;

signing the transaction using the source private key; and adding the transaction to the blockchain; and in accordance with a determination that the transfer request is not authorized, forgoing completing the transfer request, wherein:

the destination is a destination cryptographic wallet and the transfer request is generated via an artificial intelligence (AI) neuromorphic core within the crypto neuromorphic core.

11. The method of claim 10, wherein the transfer request is generated by a user of the first electronic device.

12. The method of claim 10, wherein the AI neuromorphic core comprises a NPU.

13. The method of claim 10, wherein the transfer request is generated by the AI neuromorphic core in response to sensor input.

14. The method of claim 13, wherein the sensor input comprises one or more of location information, sound information, or visual information.

15. The method of claim 13, wherein the transfer request is generated by the AI neuromorphic core without user input.

16. The method of claim 10, wherein the transfer request is generated in response to receiving a request for tokens from a second electronic device.

17. A first electronic device comprising:

a central processing unit coupled to a system bus;

a network interface configured to interface with an external device; and an integrated circuit comprising with a crypto neuromorphic core, for transferring tokens from a source cryptographic wallet to a destination, the crypto neuromorphic core configured to perform a method comprising:

generating a transfer request including a destination identifier of the destination on a blockchain, a source identifier of the source cryptographic wallet on the blockchain corresponding to the first electronic device, and a token amount;

authenticating the transfer request;

in accordance with a determination that the transfer request is authorized:

retrieving a source private key associated with the source identifier of the source cryptographic wallet from a non-transitory computer-readable memory within the crypto neuromorphic core;

generating a transaction transferring the token amount from the source cryptographic wallet to the destination;

signing the transaction using the source private key; and adding the transaction to the blockchain; and in accordance with a determination that the transfer request is not authorized;

forgoing completing the transfer request, wherein:

the determination that the transfer request is authorized includes the crypto neuromorphic core authenticating a user of the first electronic device.

18. The first electronic device of claim 17, wherein the destination is a destination cryptographic wallet and the transfer request is generated by an artificial intelligence (AI) neuromorphic core within the crypto neuromorphic core, wherein the AI neuromorphic core comprises a NPU.

19. The first electronic device of claim 18, wherein the transfer request is generated by the AI neuromorphic core in response to sensor input.

20. The first electronic device of claim 18, wherein the transfer request is generated by the AI neuromorphic core without user input.

21. The first electronic device of claim 17, wherein:

the crypto neuromorphic core including a wallet processing core comprising a processor and an I/O interface; and the wallet processing core authenticates the user of the first electronic device through requests via the I/O interface.

22. The first electronic device of claim 18, wherein the AI neuromorphic core generates transfer request using behavioral modeling, face recognition, voice recognition, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, iris recognition, or fingerprint matching.

23. The first electronic device of claim 18, wherein the determination that the transfer request is authorized includes the AI neuromorphic core authenticating a user of the first electronic device using behavioral modeling, face recognition, voice recognition, gait recognition, sentiment analysis, biometrics, processes automation, text analytics, pattern recognition, natural language processing, image recognition, machine vision, reactive policies, self-awareness, limited memory policies, hyperbolic neural networks, deep neural networks, artificial neural networks, iris recognition, or fingerprint matching.

* * * * *